United States Patent
Simensen et al.

(12) 
(10) Patent No.: US 6,407,226 B1
(45) Date of Patent: Jun. 18, 2002

(54) USE OF G-BLOCK POLYSACCHARIDES

(75) Inventors: Merethe Kamfjord Simensen, Tønsberg; Edvar Onsøyen, Drammen; Kurt Ingar Draget, Ranheim; Olav Smidsrød, Trondheim; Therese Fjæreide, Drammen, all of (NO)

(73) Assignee: FMC Biopolymer AS, Drammen (NO)

( * ) Notice: Subject to any disclaimer, the term of this patent is extended or adjusted under 35 U.S.C. 154(b) by 0 days.

(21) Appl. No.: 08/891,632

(22) Filed: Jul. 11, 1997

(30) Foreign Application Priority Data

Jul. 12, 1996 (NO) ................................. 962936

(51) Int. Cl.[7] .................. C07H 1/00; C08B 37/04; C08B 37/06; A61K 31/715
(52) U.S. Cl. ................ 536/124; 536/3; 536/123; 536/2; 514/54; 426/658
(58) Field of Search ............................ 536/2, 3, 123, 536/124; 514/54; 426/658

(56) References Cited

U.S. PATENT DOCUMENTS

| | | | | |
|---|---|---|---|---|
| 3,764,707 A | * | 10/1973 | Habersberger | 424/361 |
| 4,528,205 A | * | 7/1985 | Turrisi | 426/613 |
| 5,490,876 A | * | 2/1996 | Warmerdam et al. | 106/209.1 |
| 5,503,771 A | * | 4/1996 | Staley et al. | 252/313.1 |

OTHER PUBLICATIONS

Smidsrod et al.. 'Chemistry and Physical Properties of Alginates.' Carbohydrates in Europe, May 1996, pp. 6–13, Jul. 1996.*

* cited by examiner

*Primary Examiner*—Gary Geist
*Assistant Examiner*—Everett White

(57) ABSTRACT

The use of G-block polysaccharides as a modulator for the rheology in a mixture in which a gelling, water-soluble polysaccharide is a component to give the final product a changed viscosity, stability, elasticity, rigidity or similar.

50 Claims, 20 Drawing Sheets

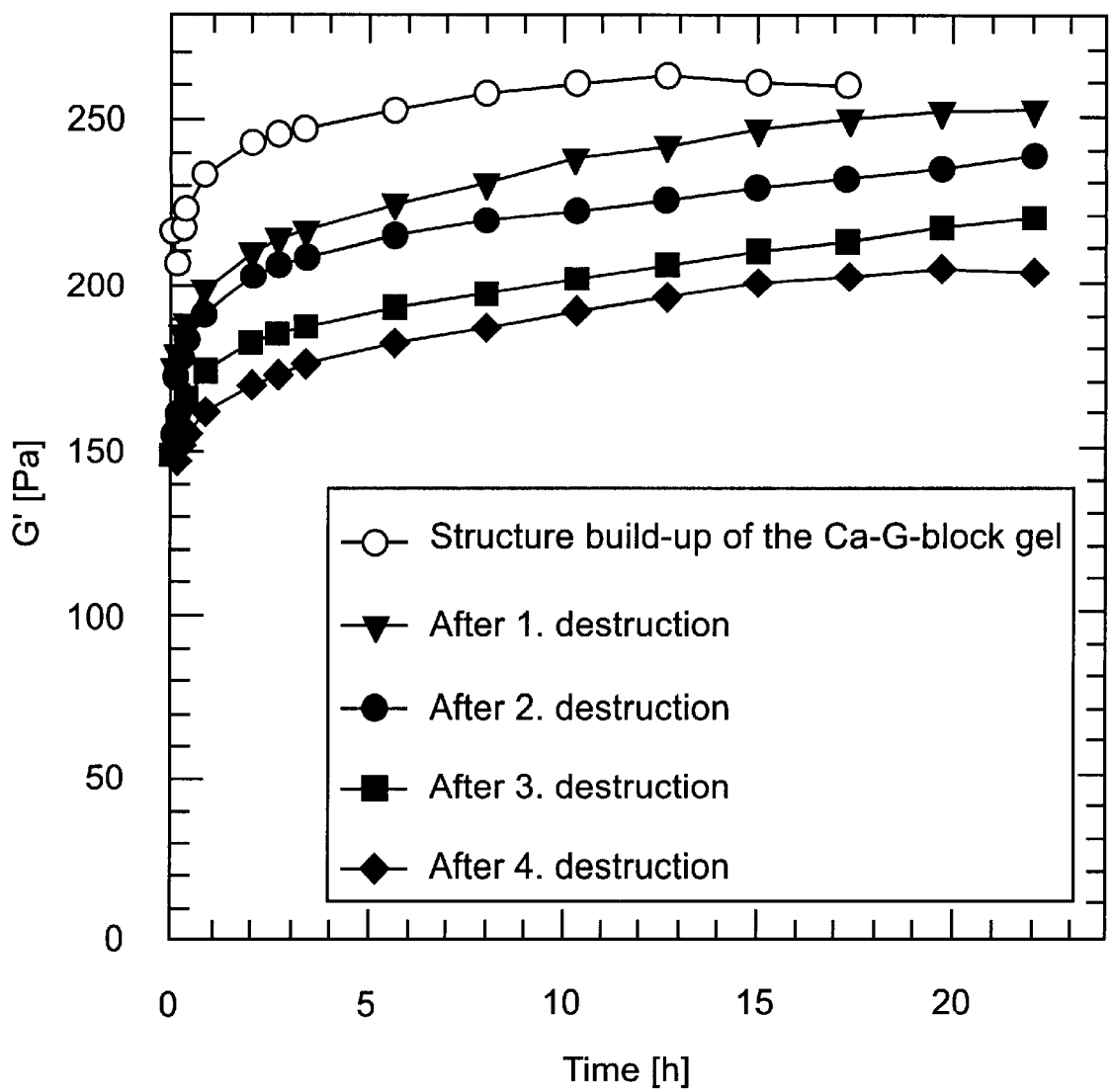

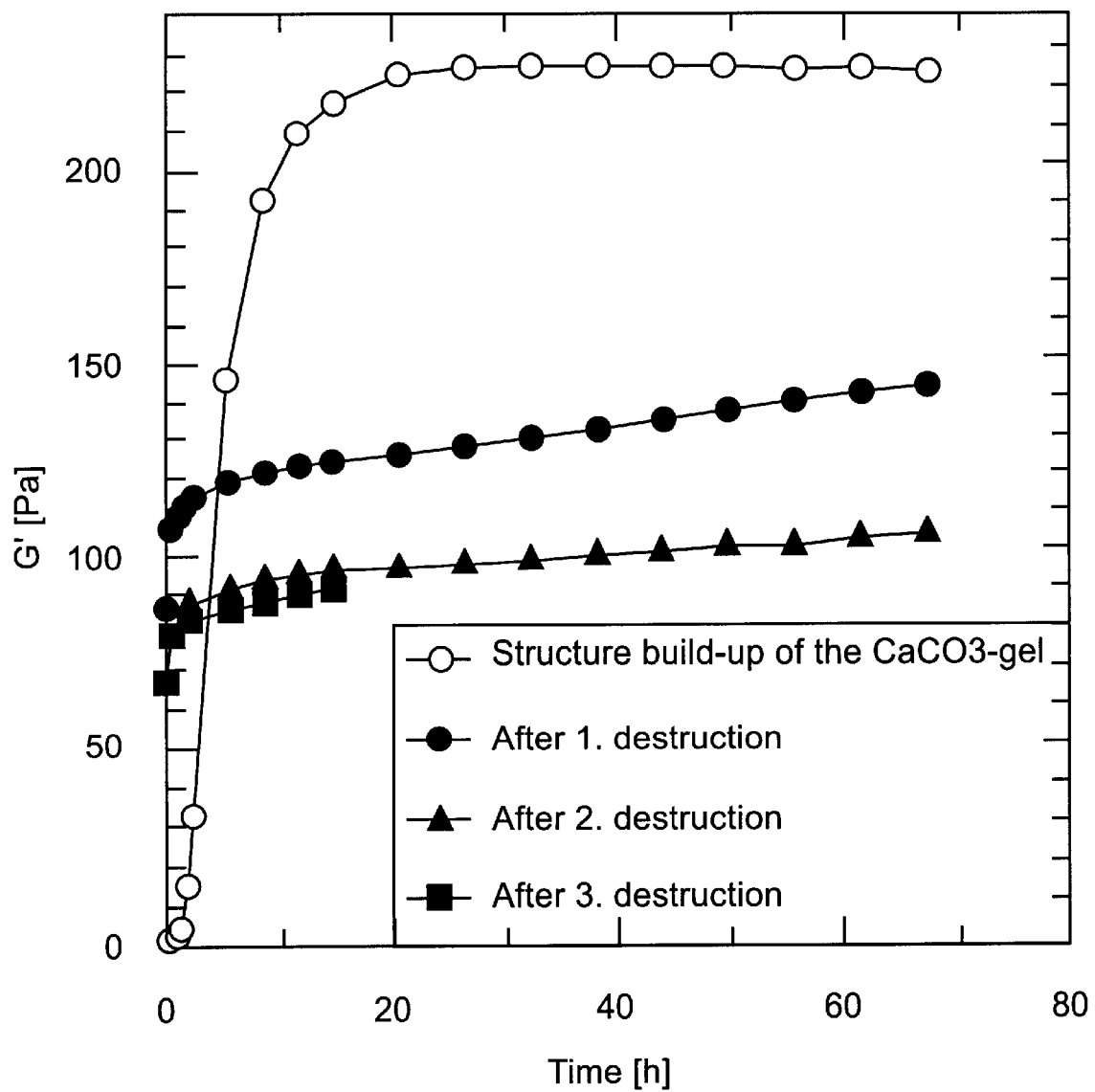

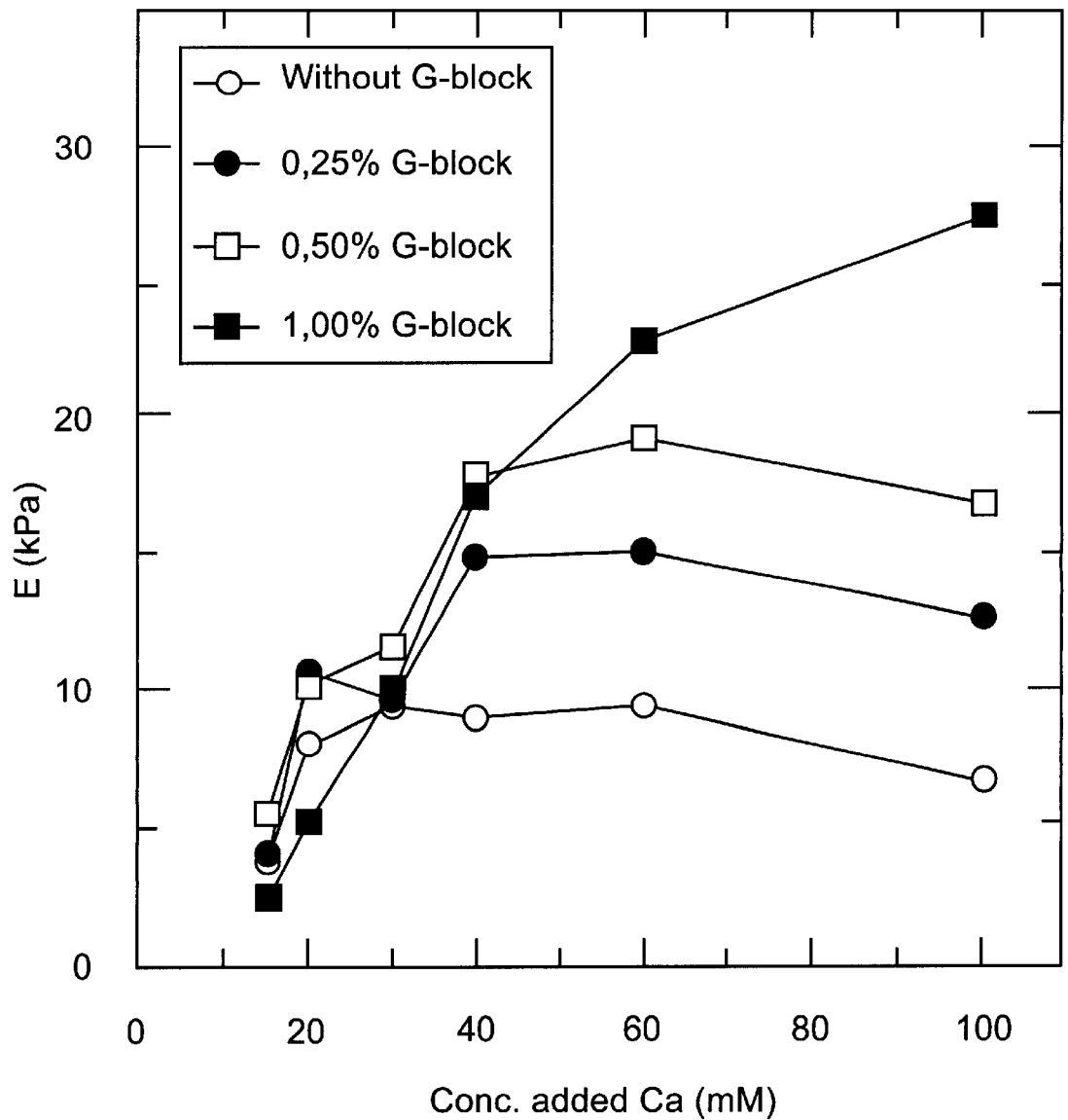

Syneresis as function of added G-block

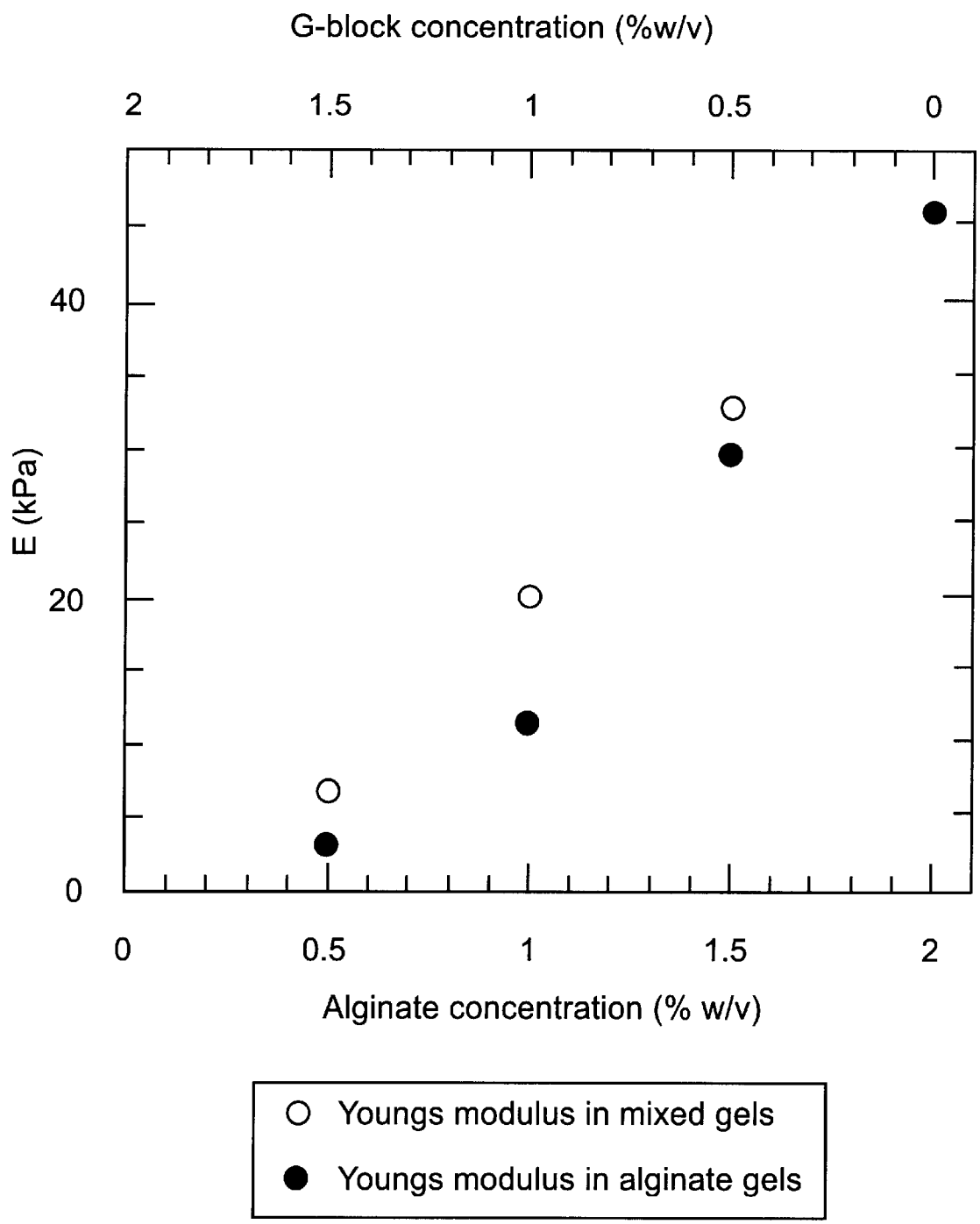

Initial Gelling Kinetics in milk system

USE OF G-BLOCK POLYSACCHARIDES

BACKGROUND OF THE INVENTION

1. Field of the Invention

The present invention concerns the use of guluronic acid-rich alginates or galacturonic acid-rich pectins, so-called G-block polysaccharides, as modulator for the rheology in a mixture in which a gelling, water-soluble polysaccharide is a component which is intended to give the final product a changed viscosity, stability, elasticity, rigidity or similar.

Alginates are isolated from marine brown algae. Alginate is also produced in soil bacteria such as *Azotobacter vinelandii* and *Azotobacter crococcum* and many different Pseudomonas bacteria, but the commercially available alginate stems mainly from brown algae.

Pectins can be isolated from many different sources as it is found in the cell walls of fruit and vegetables, but the commercially available pectins are usually isolated from apples or citrus fruits.

These polysaccharides, alginate and pectin, are used in foods and in pharmaceutical, dental, cosmetic and other industrial products. The most common industrial uses are based on their hydrocolloid and polyelectrolytic nature, which forms the basis for the gelling, thickening, stabilising, swelling and viscosity-producing properties.

In foods such as jam, ice cream, packet soups and sauces, polysaccharides have a thickening, stabilising effect. In mayonnaises and dressings, they also act as an emulsion stabiliser.

In products such as baking creams and tinned pet food, the ability of alginate to form thermally stable gels, which are produced and hardened at room temperature, is used.

There is also great potential for the use of alginate in biotechnological and medical applications. Examples of this are the mass production of alginate-based solid nutrient medium for plant tissue cultures, alginate as an administration medium with slow release of a drug and encapsulation of live insulin-producing cells in alginate gel for implantation in patients.

Alginates are salts of alginic acid, a linear heteropolysaccharide consisting of $(1\rightarrow 4)$ linked $\beta$-D-mannuronic acid, designated M, and $\alpha$-L-guluronic acid, designated G. These two uronic acids have the following formulae:

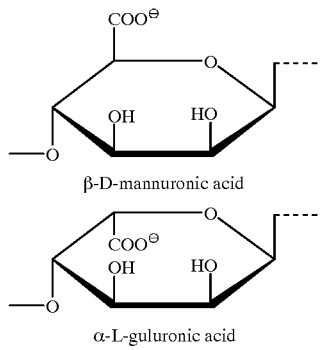

β-D-mannuronic acid

α-L-guluronic acid

The polymers exist as homopolymer sequences of mannuronic acid, called M blocks, homopolymer guluronic acid sequences, called G blocks, and mixed sequences of mannuronic acid and guluronic acid units, so-called MG blocks or alternating blocks.

In order to illustrate the structure of the alginates, we show a schematic representation of a possible block structure.

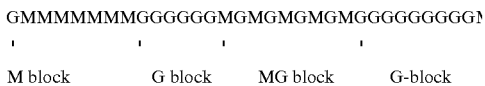

Usually, alginate contains all three types of blocks and a block generally consists of three to thirty monomer units. The distribution of blocks depends on the type of algae from which the alginate is isolated as well as the age and part of the plant, for example alginate from the stem may have a different sequence and block composition to alginate isolated from the leaves. The season in which the algae are harvested also affects the block composition and sequence. On the basis of our present knowledge, the maximum G content in the stem is to be found in old *L. hyperborea*. Leaves from the same species have a somewhat lower G content and shorter G blocks, but the content is still higher than in most other species. The commercially available alginates usually have a G content of 25%–70%. Pectin has a complex structure with a polysaccharide chain in which "smooth" and "hairy" regions alternate. The smooth regions consist of non-dendritic $(1\rightarrow 4)$ inked $\alpha$-D-galacturonic acid with the following formula:

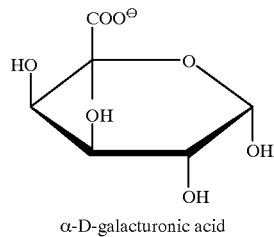

α-D-galacturonic acid with some $(1\rightarrow 2)$ linked L-rhamnose, while the hairy regions are very dendritic and consist mainly of $(1\rightarrow 3)$ and $(1\rightarrow 6)$ linked $\beta$-D-galactose, $(1\rightarrow 3)$ linked arabinose and some $(1\rightarrow 3)$ linked xylose. The galacturonic acid groups are partially methoxylated.

In the following $\alpha$-D-galacturonic acids are designated G units, and the regions which mainly consist of such G units are designated G blocks. Thus guluronic acid blocks from alginate and galacturonic acid blocks from pectin come under this common designation in the following.

Below we show a schematic representation of a possible pectin structure:

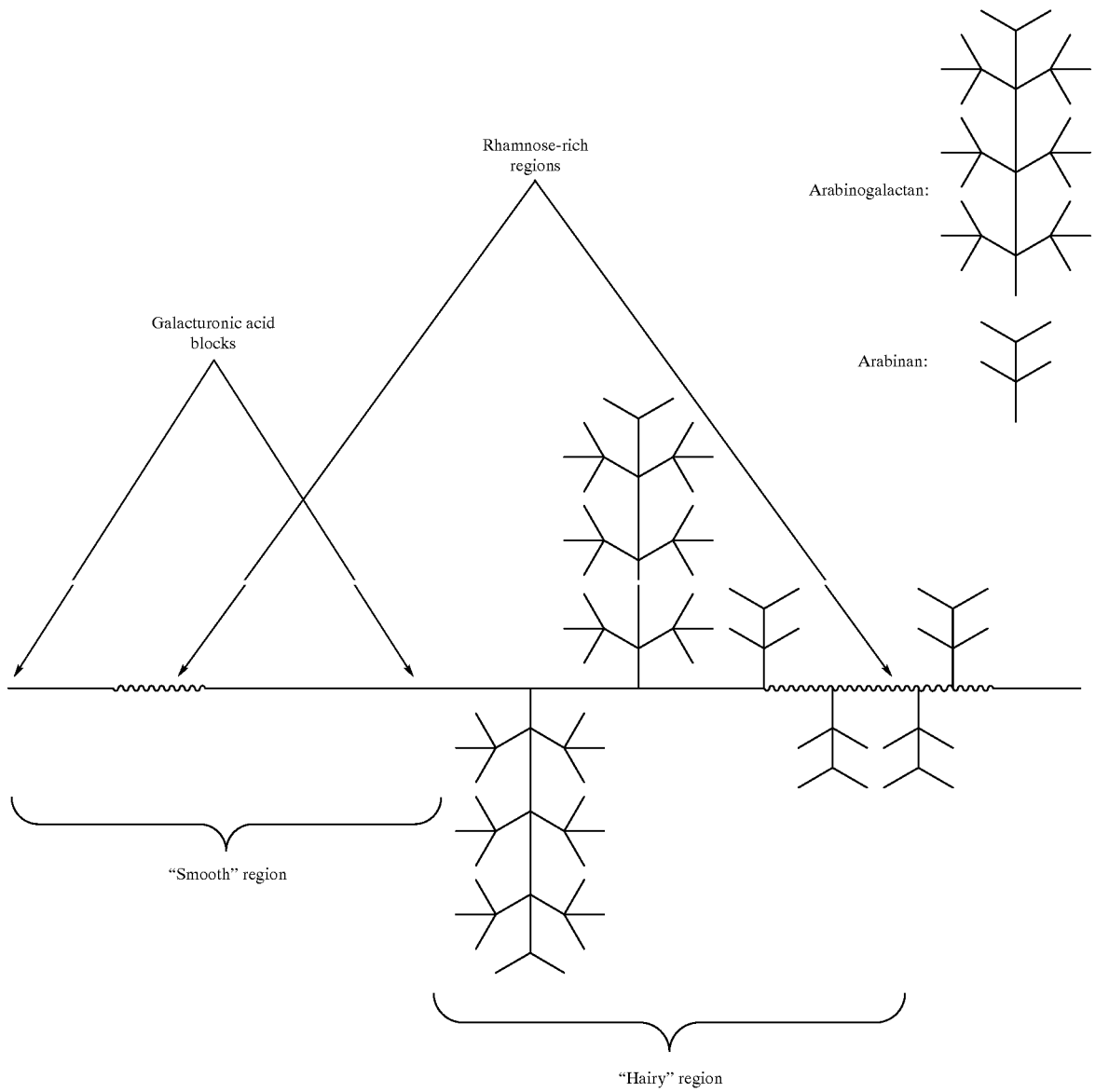

Alkali metal salts, magnesium salts and ammonium salts of alginates and pectins are water-soluble. By adding multivalent cations, for example multivalent ions such as $Ca^{2+}$, $Sr^{2+}$, $Ba^{2+}$, $Fe^{3+}$ or $Al^{3+}$ ions, to a polysaccharide solution, a gel is formed as a result of the production of ionic cross-links of several polysaccharide chains. The G units are responsible for the ability of these polysaccharides to link multivalent cations and this leads to the G blocks functioning as bindingseats between the various polysaccharide chains in connection with gelling.

The gel strength of polysaccharide gels will depend on various parameters such as the G content of the alginate or pectin, the length of the G blocks, the calcium activity and the molecular weight and concentration of the polysaccharides.

2. Description of the Related Art

Reference is made to "Food Polysaccharides and their applications", Ed. Alistair M. Stephen, [1995] Chap. 9: "Alginates", S. T. Moe, K. I. Draget, G. Skjåk-Bræk and O. Smidsrød, pp. 245–286, and Chap. 10: "Pectins", A. G. J. Voragen, W. Pilnik, J. F. Thibault, M. A. V. Axelos and C. M. G. C. Renard, pp. 287–339.

These overview articles are to be considered to be included in their entirety.

If you react a water-soluble polysaccharide in solution with an easily soluble Ca salt, you will get an undesirable, lumpy consistency of gel or gel balls, depending on the procedure. In the preparation of continuous gels, it has, therefore, been common to use either dialysis or in situ gelling methods.

In dialysis, the cross-linking ion, usually calcium, diffuses into the polysaccharide solution and this then produces a continuous, inhomogeneous gel which is strongest near the diffusion surface.

In in situ gelling, the calcium ions are released inside the polysaccharide solution. An inactive form of calcium has been used together with an agent which makes possible a slow release of the ion, which produces a homogeneous gel and the gelling speed can be controlled. It has been common to use sequestering agents such as citrate, phosphate or EDTA to achieve controlled release of the cross-linking ion.

Alternatively, insoluble salts or salts which are hard to dissolve such as calcium sulphate or calcium carbonate have been used. In connection with the addition of an agent which makes possible a slow release of protons and thus a slow release of calcium ions, the gelling speed can be controlled. An example of such an agent is D-glucono-δ-lactone (GDL).

Another possibility, which is used in tooth filling masses, is to replace the lactone with a system consisting of acid, base and a buffer. The buffer ($Na_4P_2O_7$) reduces the gelling speed by initially linking the calcium ions which are released from the calcium sulphate. This produces a self-gelling system in which the gelling is started when water is added at the user's premises.

From U.S. Pat. Nos. 2,441,720 and 2,918,375 (Kelco Company), a procedure is known for the production of alginate gel in which a water-soluble alginate salt (usually potassium or sodium alginate) is converted with a calcium salt which is hard to dissolve such as tricalcium phosphate or calcium tartrate. In these systems, the calcium ions are released by means of acid or acidifying agents. The reaction speed of the reaction between the calcium ion and the water-soluble alginate is controlled by means of a gel-delaying or gel-inhibiting agent such as sodium hexametaphosphate.

In U.S. Pat. No. 3,060,032 (General Foods Corp.), calcium alginate gel is used to improve the freeze-thaw stability in frozen dessert jellies. This calcium alginate gel is produced from sodium alginate, calcium tartrate and sodium hexametaphosphate. The reaction speed of the reaction between the calcium ions, which are released from the tartrate, and the sodium alginate is controlled by means of the sodium hexametaphosphate.

The use of calcium alginate gel in thermally stable baking creams is known from U.S. Pat. No. 3,352,688 (Kelco). This system consists essentially of sodium alginate, dicalcium phosphate and sodium hexametaphosphate.

In U.S. Pat. No. 3,770,462 (Kelco), the use of sodium phosphor alginate and calcium sulphate dihydrate is described for the production of milk puddings of type vanilla pudding. In this case, the alginate and calcium sequestering agent are mixed carefully during the production of the sodium phosphor alginate from alginic acid. This makes possible the hydration of the alginate in cold milk because the milk calcium is sequestered by the phosphate in the alginate. The calcium which is released from the calcium sulphate dihydrate reacts with the soluble alginate so that a homogeneous calcium alginate gel is formed.

U.S. Pat. No. 2,809,893 describes a dry powder mixture for forming gels for use in desserts. Such gels contain sugar, alginate, sodium hexametaphosphate, sodium citrate, citric acid, heat-treated water-free monocalcium phosphate and various taste enhancers and colorants.

EP345886B1 describes an alginate gelling system for meat products in which the release of calcium and thus the gelling speed are controlled by means of encapsulated calcium salts. All commonly used calcium salts approved for use in food products can be used and the examples stated include calcium chloride dihydrate, calcium lactate pentahydrate, calcium acetate, calcium malate and calcium gluconate. The calcium salts are encapsulated in a fat derivative which may be a fatty acid, a glyceride and preferably also a hardened vegetable oil.

U.S. Pat. No. 5,503,771 describes a gelling suspension which contains colloidal metal particles or ceramic particles, water and an effective quantity of a biopolymer dispersant with a molar weight of at least 1000 to 5000 g/mol, as well as a biopolymer gelling agent which has a molar weight of at least 50,000 g/mol and which can be converted from a non-gelled state to a gelled state. The biopolymer dispersant may be chosen from, among others, a group consisting of a polymannuronic acid-rich hydrolysis product of alginate, a polyguluronic acid-rich hydrolysis product of an alginate, poly-D-glutamic acid, poly-L-glutamic acid, poly-DL-aspartic acid, pectin and mixtures of these. The biopolymer gelling agent can be chosen from a group consisting of gelling polysaccharides, polypeptides, proteins or nucleic acids. Alginates with molar weights in the order of 75,000 to 100,000 g/mol or higher are stated as possible polysaccharides, among others. The biopolymer dispersant is to disperse the colloidal particles in water and thus contribute to the formation of a non-aggregated suspension which has a low, pourable viscosity so that the final suspension can be transferred to a casting mould before gelling is started, after which the product is pyrolysed and sintered. The main intention is to achieve a dispersed product in which the gelling keeps the dispersed particles in place. There is no description whatsoever concerning the use of this combination of alginate and polyguluronic acid-rich hydrolysis product of alginate as a modulator for rheology. On the contrary, as both polymannuron-rich hydrolysates and polyguluron-rich hydrolysates of alginate can be used with no difference as the dispersant in combination with alginate as the gelling agent, this US patent concerns a different procedure to that of the present invention.

Problem

In order to be able to utilise the valuable properties of polysaccharides as gelling and film-forming agents, viscosity producers and stabilisers of emulsions and suspensions in various types of products, it is of decisive importance to control the parameters such as gelling kinetics (for example, absorption of cross-linking ions), gel strength and syneresis, i.e. the rheological properties. This applies to foods but also to other products such as the use of alginate as a thickener for paint paste for textile printing.

In the prior art, the gelling technique is controlled by using both calcium salts which are hard to dissolve such as phosphates, sulphates, citrates or tartrates and sequestering agents, which are very often phosphates, as well as possibly other acids or buffers.

In particular, the addition of phosphate, which has reached a high level in foods in the industrialised parts of the world, seems to be problematic because a high intake of phosphate disturbs the ion equilibrium in the body and this can have unfortunate health-related consequences. In addition, phosphates and the other additives may produce undesired effects such as poor taste and a different consistency to that desired. This applies, for example, to the production of restructured meat products and baking creams.

Against this background, there is, therefore, a need for a system which can utilise the valuable properties of polysaccharides in a controlled manner without having to use many additives or such large quantities of additives, in particular a system which avoids or reduces the use of phosphate.

In dairy products, i.e. milk-based products, it is desirable to produce various effects from polysaccharide, for example in some products only a thickening effect is required, as in yoghurt, while in other cases, a strong gel is required, as in the production of pudding. As there are large quantities of calcium in milk and the calcium content affects the parameters such as gel strength and syneresis, there are problems in connection with obtaining products of the desired consistency and stability. If the end products are too exposed to syneresis, i.e. a contraction of the gel during the expulsion of liquid, the quality is seriously reduced and the durability curtailed.

Regarding the use of alginate in paint paste used in textile printing, the thickening and shear thinning properties are used. In areas where there is hard water, i.e. where the calcium content of the water is high, local gel particles are produced (so-called "fish eyes"). In order to avoid this, sequestering agents, usually phosphates, a re added. These agents later constitute an environmental problem as they are washed out and end up in drainage water, from which they must be removed.

There is, therefore, also a need for a system which can utilise the valuable properties of polysaccharides within such areas of application in which the presence of natural, i.e. not added calcium, constitutes a problem. This requires a system in which the rheological properties of alginates or pectins can be controlled when the substances are used as thickeners, gelling agents, binders or stabilisers.

BRIEF SUMMARY OF THE INVENTION

According to the present invention, it has now, surprisingly, been found that "G-block polysaccharides" can be used as modulators for rheology in gelling polysaccharide systems within various areas of application. This means that "G-block polysaccharides", i.e. blocks of guluronic acid from alginate or blocks of galacturonic acid from pectin, make it possible, in an alginate and/or pectin system, to control the gelling kinetics, gel strength, viscosity, elasticity, equilibrium properties and syneresis.

BRIEF DESCRIPTION OF DRAWINGS

With reference to the examples set forth below

FIGS. 7a and 7b show dynamic measurements for the gelling process;

FIG. 8a shows gel strength as function of added of G-block and calcium;

FIGS. 9a and 9b are similar to FIGS. 2a and 2b;

DETAILED DESCRIPTION OF THE INVENTION

Figure 1A:
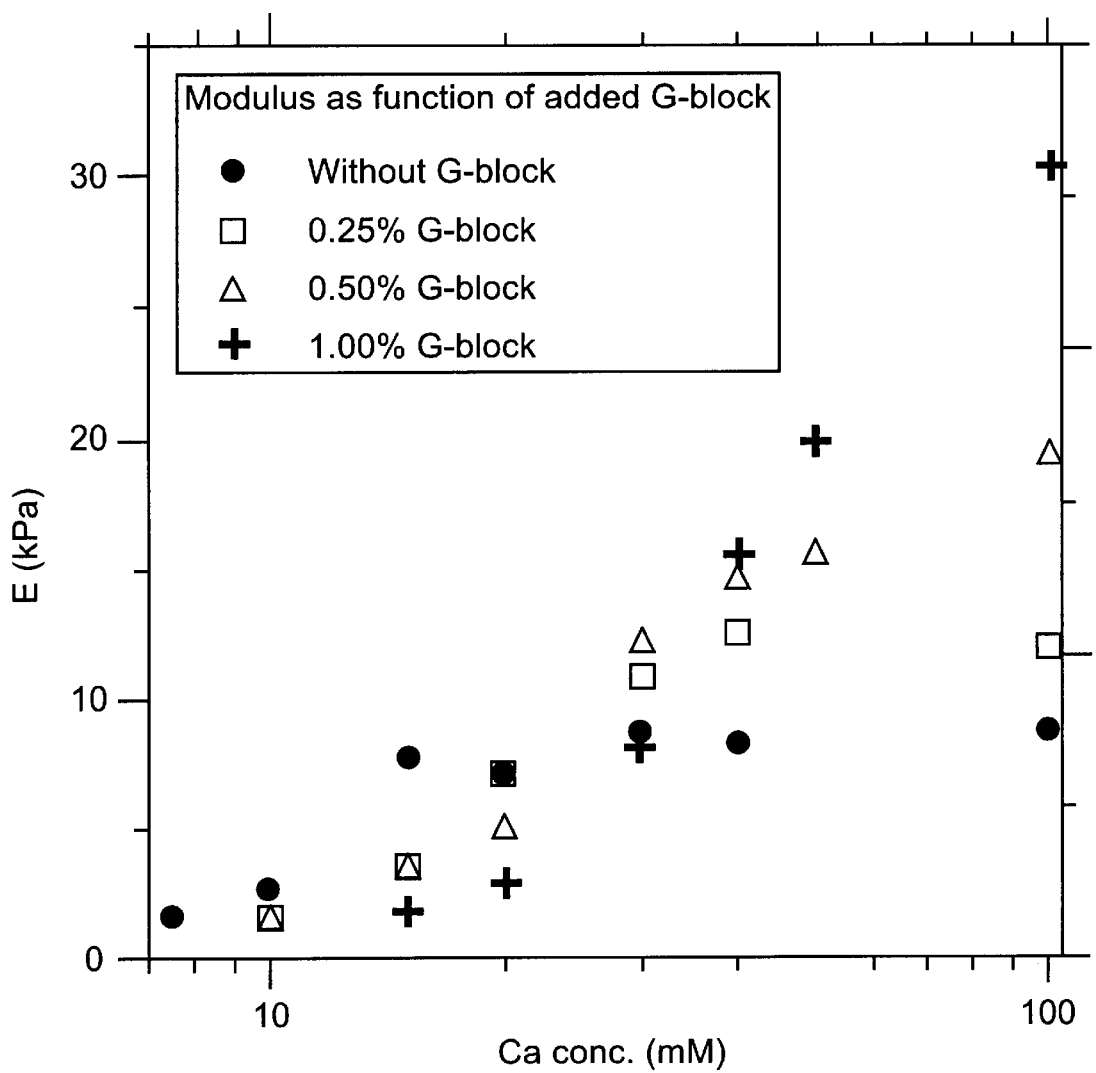
FIG. 1a shows gel strength as a function of added G-block and calcium content.

In the present invention, the term polysaccharide is meant mainly to comprise the polysaccharides alginate and pectin, but other gelling polysaccharides which behave in the same way as the polysaccharides described here are also covered by the scope of the claim. It is most preferable to use alginate in the present invention. Of pectins, it is preferred, in particular, to use low-methoxylated pectin, so-called LM pectin.

In accordance with the present invention, a procedure has been found for controlling the rheology, i.e. viscosity, elasticity, gelling kinetics and gelling strength, in the gelling of alginate-based and pectin-based systems. The procedure is characterised in that it uses "G-block polysaccharides" as the modulator for the rheology.

The procedure, according to the present invention, for controlling the rheology, i.e. viscosity, elasticity, gelling kinetics and gelling strength, in a mixture of which a gelling, water-soluble polysaccharide is a component to give the final product a changed viscosity, elasticity, stability, rigidity or similar, is characterised in that a "G-block polysaccharide" is added to the stated mixture either (a) as a water-soluble "G-block polysaccharide" in the presence of a source of a cross-linking ion or (b) as a "G-block polysaccharide" with a cross-linking ion and, if necessary, an aqueous solvent is added.

The present invention concerns, in a second aspect, the use of a "G-block polysaccharide" as a modulator for the rheology, i.e. viscosity, elasticity, gelling kinetics and gelling strength, in a mixture of which a gelling, water-soluble polysaccharide is a component to give the final product a changed viscosity, elasticity, stability, rigidity or similar, which application is characterised in that a "G-block polysaccharide" is added to the stated mixture either (a) as a water-soluble "G-block polysaccharide" in the presence of a source of a cross-linking ion or (b) as a "G-block polysaccharide" with a cross-linking ion and, if necessary, an aqueous solvent is added.

In a third aspect, the present invention concerns the use of a "G-block polysaccharide" as a modulator for the rheology, i.e. viscosity, elasticity, gelling kinetics and gelling strength, in a mixture of which a gelling, water-soluble polysaccharide is a component to give the final product a changed viscosity, elasticity, stability, rigidity or similar, which application is characterised in that a "G-block polysaccharide" is used either (a) as a substitute for another sequestering agent for the multivalent ion in the stated mixture, in which connection a water-soluble "G-block polysaccharide" is used in the presence of a source of a cross-linking ion or (b) as a substitute for another source of a cross-linking ion in the stated mixture, in which connection a "G-block polysaccharide" with a cross-linking ion is added and, if necessary, an aqueous solvent is added.

According to a fourth aspect of the present invention, a "G-block polysaccharide" can be used in a self-gelling polysaccharide mixture and this application is characterised in that the stated mixture consists of "G-block polysaccharide" with a cross-linking ion in the solid phase and a gelling, water-soluble polysaccharide in the solid phase, in which connection the gelling process is started by the addition of water or an aqueous solution or an aqueous solution in a mixture with a non-aqueous component.

In this connection, the term "G-block polysaccharide" is meant to comprise low-molecular alginate alginic acid or pectin which has a high content of guluronic acid and galacturonic acid respectively. Any polysaccharide or polysaccharide fragment which contains at least two G units in a block can be used as a "G-block polysaccharide" in accordance with the present invention, but it is preferred to use polysaccharide fragments which have an average molar weight of 1,000–100,000 g/mol. It is more preferred for the "G-block polysaccharides" to be chosen from the molar weight range 1,000–50,000 g/mol, but it is most preferred to work within the molar weight range 2,000–20,000 g/mol.

The term fragment is meant to comprise small parts of whole alginate or pectin chains or commercially available polysaccharides (whole polysaccharide).

In some cases, it is also possible to use "G-block polysaccharides" which have an average molar weight of over 100,000 g/mol, but subject to the restriction that they must have the same function as the "G-block polysaccharides" described here.

A "G-block polysaccharide" may, for example, be a fragment of a naturally occurring alginate or pectin which has a high content of G blocks such as alginate isolated from L. hyperborea. It may also be an alginate fragment which is enriched with G blocks or which mainly consists of G units which are produced biotechnologically in a bacterium. Another possibility for producing G-block-rich alginate fragments which are enriched with G blocks is the chemical conversion of M units to G units using an enzyme of the type mannuronan-C-5-epimerase.

Any polysaccharide, in particular alginate or pectin, which can form a gel in a certain concentration range can be used as the polysaccharide or whole polysaccharide. It is also possible to use mixtures of these two polysaccharides where appropriate.

Depending on the intended application, an alginate/pectin with a high or low G content will be used in order to obtain the desired properties in the final product. If, for example, a thickening effect is required, it is necessary to choose a polysaccharide in a quality with a low G content in order to obtain weak gel formation or no gel formation. Accordingly, it is necessary to choose a polysaccharide in a quality with a high G content in order to obtain strong gelling, for example in the production of pudding. It is also possible to use mixtures of alginate qualities, regarding molar weight or block content, as the polysaccharide in the present invention.

Water-soluble polysaccharides, whether a whole alginate/pectin or a "G-block polysaccharide", may be sodium, potassium, magnesium and ammonium polysaccharides. It is also possible to have water-soluble polysaccharides which contain several of these types of gegenions, as well as small quantities of $Ca^{2+}$, but the most preferred is sodium polysaccharide or sodium "G-block polysaccharide". It will be clear to a person skilled in the art that solubility depends on concentration and temperature, and the present invention is intended, where this term is used, to comprise polysaccharides chosen for their solubility properties in the relevant concentration and application range.

Similarly, the term "gelling polysaccharide" is used with the proviso, which is obvious to a person skilled in the art, that gelling depends, among other things, on the concentration of both the polysaccharide and the multivalent gegenion. Any multivalent ion which produces gelling with polysaccharide may be used and examples of such ions are $Ca^{2+}$, $Sr^{2+}$, $Ba^{2+}$, $Fe^{3+}$ and $Al^{3+}$, although $Ca^{2+}$ is the most preferred cross-linking ion ($Ca^{2+}$ will be used, in the following, as the representative of multivalent, cross-linking ions). It is assumed that, when the term "gelling polysaccharide" is used, the present invention comprises work within the concentration limits which produce gelling. The present invention is also intended to comprise both strong gelling, which will, for example, produce a jelly or pudding consistency, and weak gelling, which only produces a thickening and/or stabilising effect. The desired effect is achieved, as stated above, by choosing the G content and molar weight of the whole polysaccharide depending on the intended application.

When, according to the present invention, a "G-block polysaccharide" with a cross-linking ion is to be added in connection with the procedure and application, it is chosen from a group consisting of "G-block polysaccharides" with multivalent calcium, strontium, barium, iron or aluminium as the gegenion. Calcium is particularly preferred.

The source of the cross-linking ion can be chosen from among naturally occurring calcium sources such as dairy products, calcium-containing proteins, bone meal or silage.

The source of the cross-linking ion can, if appropriate, also be a calcium salt which is hard to dissolve such as $CaSO_4$, $CaCO_3$ or chelate-linked calcium such as CaEDTA, possibly in combination with a proton source, as a specialist well knows. The source for the cross-linking ion can also be an easily soluble calcium salt which is added (a) by diffusion into the mixture or (b) as a microencapsulated salt with controlled release of calcium in connection with adjustment of pH, temperature or other parameters.

Alginates of various types which can be used in accordance with the present invention are commercially available from, among other companies, Pronova Biopolymer a.s, Drammen, Norway. Pectin is commercially available from, among others, Copenhagen Pektin/Hercules, Denmark.

Low-molecular "G-block alginates" can be produced by means of acid hydrolysis, which is well known in the trade. The procedure is described in the following publications, among others:

A. Haug, B. Larsen and O. Smidsrød (1966) "A study of the constitution of alginic acid by partial hydrolysis", Acta Chem. Scand., 20, 183–190. A. Haug, B. Larsen and O. Smidsrød (1967) "Studies of the sequence of uronic acid residues in alginic acid", Acta Chem. Scand., 21, 691–704 and U.S. Pat. No. 5,503,771, Example 2.

These references are to be considered to be included in their entirety.

The quantity ratio of polysaccharide to "G-block polysaccharide" can be varied within broad limits which will depend entirely on the desired effect and area of application and will, among other things, depend on the type of alginate or pectin chosen, the molar weight and the calcium activity. Therefore, it will be preferred to work within the range in which the ratio of polysaccharide: "G-block polysaccharide" is 100:1–1:100, or preferably 10:1–1:10. However, it will be most preferred to work within the range in which the polysaccharide: "G-block polysaccharide" ratio is 4:1–1:4.

The absolute concentration of the polysaccharide and "G-block polysaccharide" in a mixture will, moreover, depend entirely on the intended application and the control of the rheology which is required and will, among other things, depend on the type of alginate or pectin chosen, molar weight and calcium activity.

According to the present invention, it has thus, surprisingly, been found that "G-block polysaccharides" can be used as modulators for the rheology in alginate-based and pectin-based systems. In practice, this means that it is possible to use "G-block polysaccharides" either as a source of a multivalent ion, in particular calcium, or as a sequestering agent for such a multivalent ion, in which connection the latter comprises first absorption of this ion and then regulated release in connection with gelling to a whole polysaccharide in a mixture in which this polysaccharide is added as a gelling agent, thickener, stabiliser, binder or similar.

According to one aspect of the present invention, "G-block polysaccharide" with a cross-linking ion, in particular Ca "G-block polysaccharide", will thus be able to replace other Ca sources in a gelling polysaccharide system in which it is desired to use alginate or pectin in order, particularly in foods, to avoid or greatly reduce the use of other additives such as phosphate and to obtain products to which only a combination of various polysaccharides has been added with simultaneous control of the gelling kinetics, gel strength and syneresis.

The stated combination of polysaccharides may, where alginate and pectin are concerned, comprise the following four variants:

|   | Polysaccharide: | G-block polysaccharide: |
|---|---|---|
| (a) | alginate | G-block alginate |
| (b) | alginate | G-block pectin |
| (c) | pectin | G-block alginate |
| (d) | pectin | G-block pectin |

In addition to this, as stated earlier, mixtures of alginate and pectin can be used either as a whole polysaccharide or as a "G-block polysaccharide".

According to one aspect of the present invention, it is also possible to use a water-soluble "G-block polysaccharide", in particular Na "G-block polysaccharide", as a sequestering agent for Ca ions in a system together with polysaccharide. This will avoid the use of other sequestering agents, particularly phosphates. This system can be used particularly advantageously in areas of use in which there is a natural calcium source.

The following advantages are obtained using the procedure and application in accordance with the present invention:

a gelling alginate system which contains only alginate
Ca "G-block polysaccharide" replaces other Ca sources so that there is no need for other sequestering agents
Na "G-block polysaccharide" is used as a sequestering agent instead of, for example, phosphate
polysaccharide can be used in products in which there is a natural Ca source without any need for other sequestering agents
controlled start of gelling and gelling kinetics
controlled gel strength
increased gel strength
reduced syneresis
controlled gelling speed, i.e. the possibility of both increased and reduced gelling speed
more shear reversible gels.

The present invention is, moreover, described in further detail in the attached claims and will be illustrated further using examples.

MATERIAL AND METHODS

The concept "G-block polysaccharides" includes both polyguluronate and polygalacturonate. The effect of the addition of G-block to gelling alginates was brought about in principle by adding a given volume of a 5% parent solution of water-soluble G-block to a solution of a gelling Na alginate. The final quantity of G-block was varied from 0 to 10 mg/ml. The concentration of the gelling alginate was kept constant at 10 mg/ml unless another concentration is stated. The G-block alginate (polyguluronate) which was used had a content of guluronate of 85% and an average degree of polymerisation (Dpn) of 20. The G-block pectin (polygalacturonate) was fully de-esterified and had a (Dpn) of 35. The gelling alginates used were all isolated from stalks of *Laminaria hyperborea* with a guluronate content of approximately 65%. The molecular weight was varied from 50 to 300 kDa. Unless otherwise stated, an alginate with an average molecular weight of 200 kDa was used.

Gelling, with from 7.5 to 50 mM $Ca^{2+}$, was carried out by so-called internal gelling. This means that $CaCO_3$ of low solubility was added to the solution together with D-glucono—lactone. Over time the lactone will be converted into gluconic acid which converts the carbonate to free $Ca^{2+}$. The gelling solution was transferred to a so-called well plate in which each individual mould was 18 mm high and had a radius of 16 mm. The equilibrium value of the gel strength was measured after 24 hours. Diffusion gelling was used with 100 mM $Ca^{2+}$. The alginate solution was placed in plexiglass cylinders and sealed with a cellulose acetate membrane at both ends. The cylinders were then placed in a bath with 100 mM $CaCl_2$. Both the gelling solution and the gelling bath also contained 200 mM NaCl in order to ensure homogeneous distribution of the alginate in the finished gel. The gel strength was measured after 24 hours.

The gel strength was measured by two methods. The equilibrium properties were measured after 24 hours by means of a compression analysis in an SMS TA-XT2 Texture Analyser with a compression rate of 0.1 mm/s. The gel strength, as Young's modulus (E), was calculated on the basis of the slope of the initial, linear part of the force-deformation curve. Kinetic (sol/gel) measurements were carried out at 20 C in a Rheologica Stress-Tech rheometer. The measurement geometry was 40 mm serrated plate-plate and the dynamic measurements were carried out at 1 Hz. A force of 10 Pa was used throughout the gelling process.

Syneresis was registered by measuring the change in volume of the finished gel compared with the volume of the mould. In connection with conversion to Ca G-block, water-soluble G-block was dissolved and added to $CaCl_2$ at a final concentration of 0.5M. The surplus calcium was washed away. Gelling took place by dry-mixing gelling alginate and Ca G-block to a 10 mg/ml final concentration of both components before dissolving the mixture. The gelling alginate in example 6 has an average molecular weight of 430 kDa. The $CaCO_3$ gel, which produces an equivalent gel strength to that of the gel with Ca G-block, was gelled with 9.5 mM $CaCO_3$. The gels were decomposed with a homogeniser, Ultra turrax, at 3000 RPM for 4 minutes. The dynamic measurements were carried out on a Bohlin VOR Rheometer at 25 C and 1 Hz. The measurement geometry was SP 30 serrated plates. The amplitude was 20%.

Milk systems

The gels in examples 1–4 were made with 9% full-cream milk powder. The concentration of the gelling alginate was kept constant at 10 mg/ml unless stated otherwise and the G-block concentration was varied from 0 to 10 mg/ml. The G-blocks were added by dry-mixing with the gelling alginate and milk powder. The G-blocks used had a content of guluronate of between 87% and 92% and an average degree of polymerisation of between 12 and 20. The gelling alginates used were all isolated from *Laminaria hyperborea* with a guluronate content of approximately 65%. Unless otherwise stated, the gelling alginate had an average molecular weight of 330 kDa. Internal gelling, as described above, was used in all the gels and the quantity of Ca2+ added varied from 15 to 100 mM.

The gel strength was measured using two methods here as well. The equilibrium properties were measured as described above, but after 23 hours. The kinetic (sol/gel) measurements were carried out on a Bohlin VOR Rheometer at 25 C and 1 Hz. The measurement geometry was SP 30 serrated plates and the amplitude was 3%.

Syneresis was registered by measuring the change in volume of the gel in question compared with the volume of a gel without syneresis.

RESULTS

Examples 1 to 4 and 6 to 10 describe the effect of polyguluronate, while example 5 concerns the effects of polygalacturonate. Examples 8 to 10 concern effects in milk systems.

EXAMPLE 1

Effect on Gel Strength and Syneresis with a Fixed Alginate Concentration

FIG. 1a shows how the gel strength changes as a function of the added G-block and calcium content with a fixed (10 mg/ml) concentration of alginate. With a low to medium content of Ca, the gel strength decreases as the content of G-block increases. This can be attributed to the G-blocks' ability to bind Ca ions without entering into the network structure. With a medium to high content of Ca, however, the gel strength increases in part considerably as the quantity of G-block increases. It can be assumed that the G-blocks, with their long sequences of homopolymer G-regions, will function as a type of bridge-builder between otherwise suboptimal nodal zones.

Figure 1B:
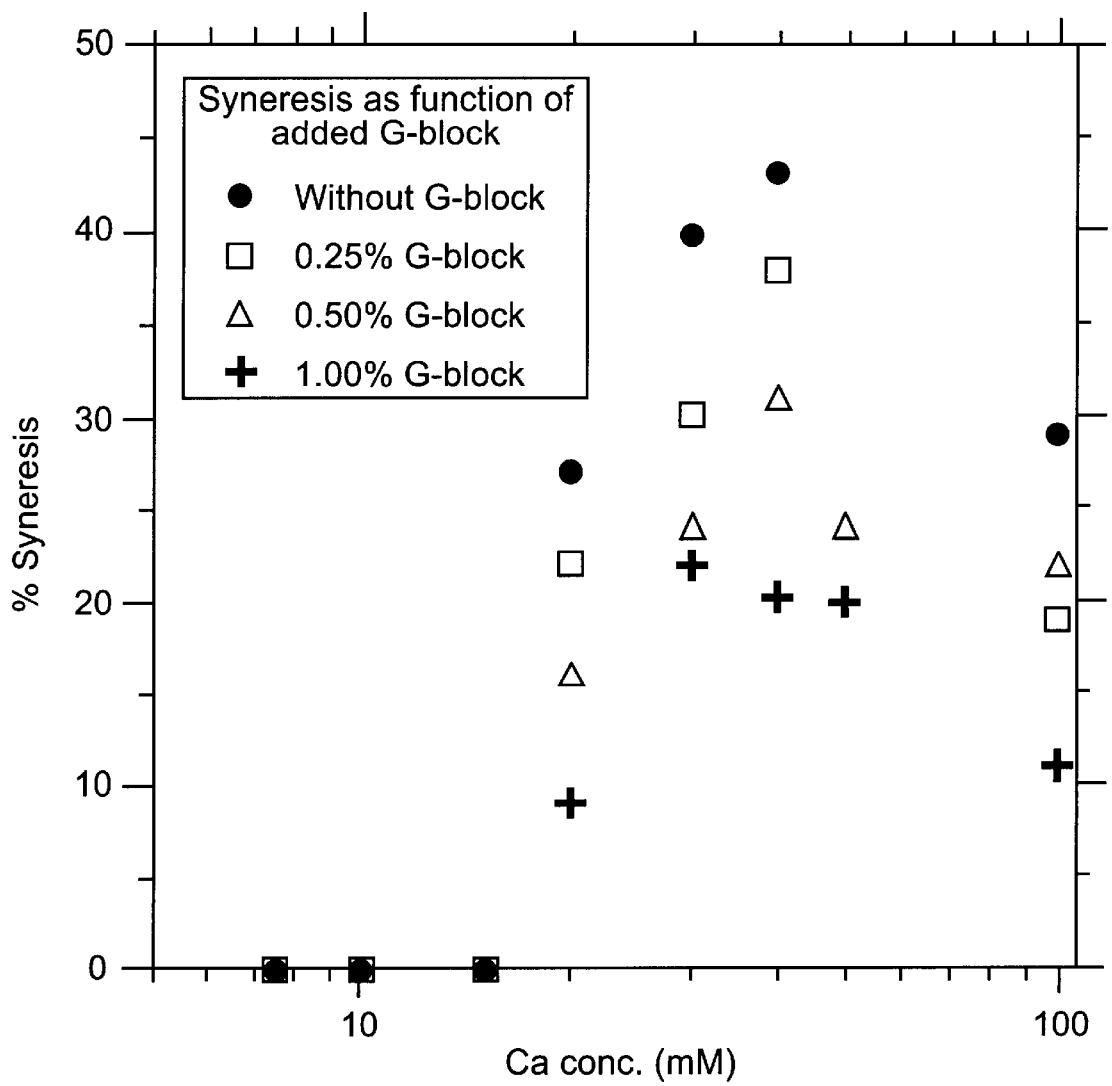
FIG. 1b shows syneresis as a function of added G-block.

FIG. 1b shows that the degree of syneresis with a high content of Ca decreases as the content of G-block increases. This can again be attributed to the G-blocks' ability to complex Ca.

EXAMPLE 2

Figure 2A:
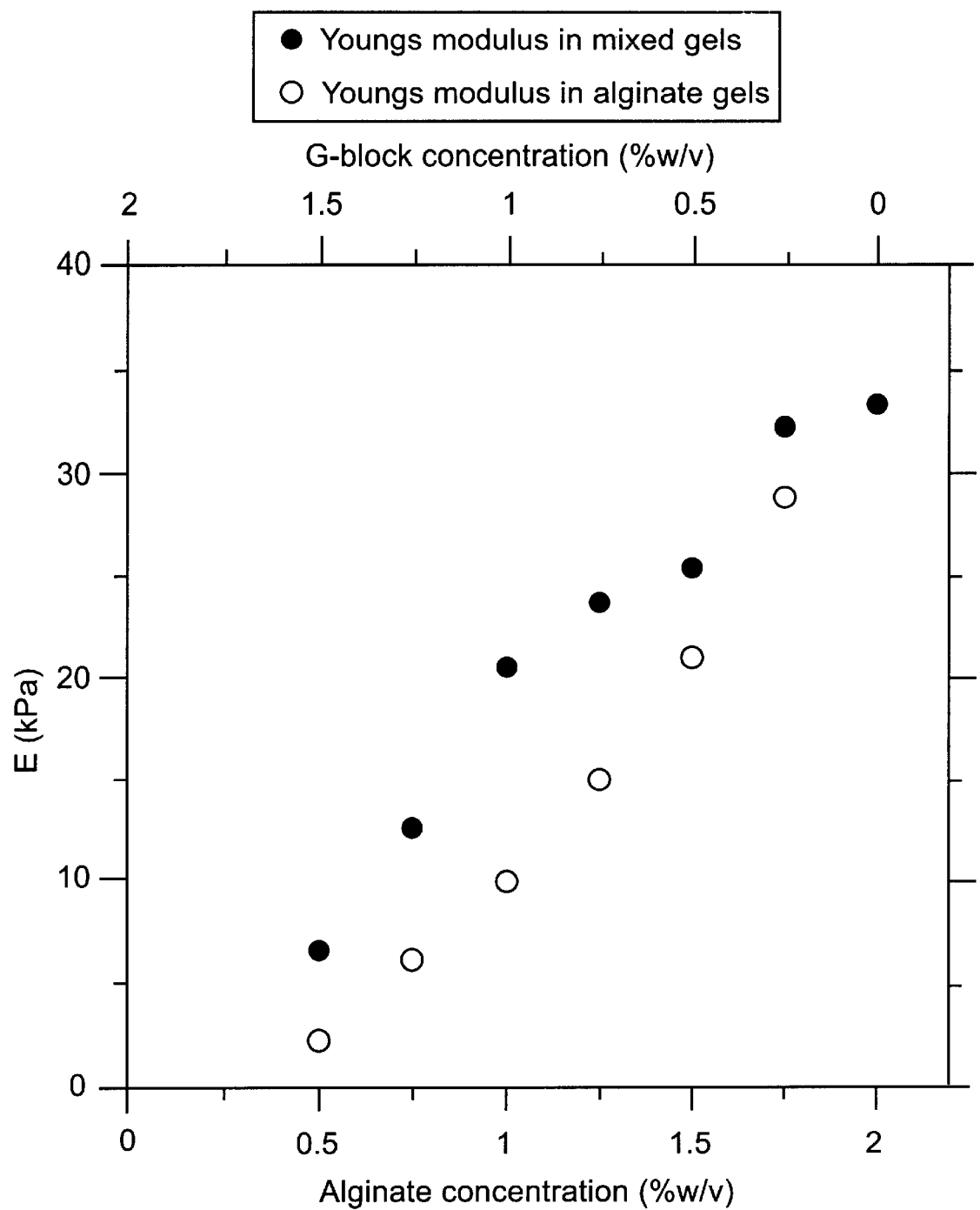
FIG. 2a shows variation of relative differences in gel strength between pure alginate gels and alginate/G-block mixtures.

Effect of a Varying Quantity of Alginate and G-block with a Fixed Quantity of Ca FIG. 2a shows how the relative differences in gel strength between pure alginate gels and alginate/G-block mixtures vary with a fixed concentration (40 mM) of Ca. The greatest relative difference, i.e. the greatest gain in the form of increased gel strength, is achieved with equivalent quantities of alginate and G-block. With other concentrations of Ca, other curves may be possible.

Figure 2B:
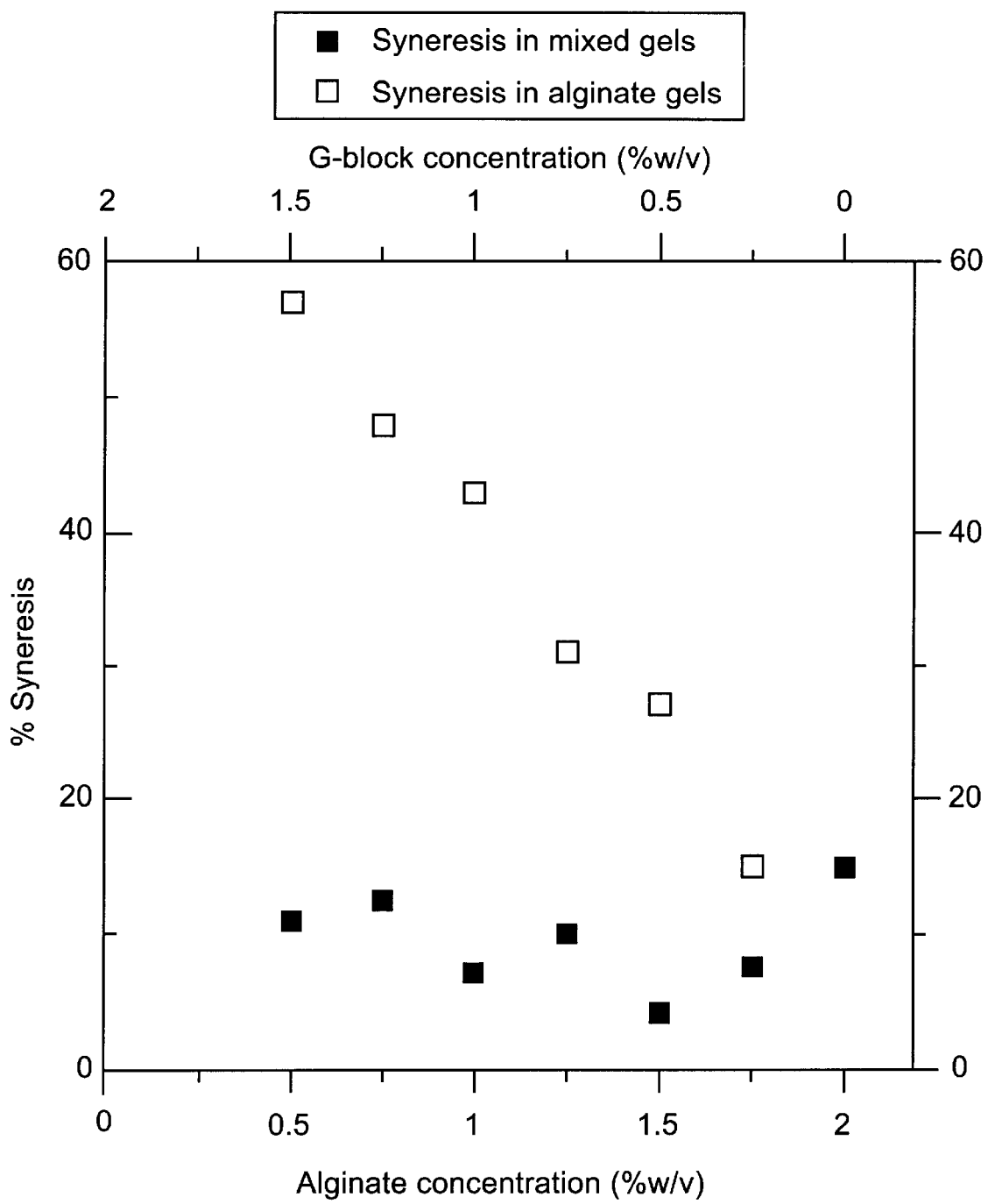
FIG. 2b shows variation of syneresis.

FIG. 2b shows how the syneresis varies in the same experiment. In alginate/G-block mixtures, the syneresis is virtually constant and varies around 10%. In pure alginate gels, the syneresis increases dramatically as the alginate concentration decreases.

EXAMPLE 3

Effect of the Molecular Weight of the Gelling Alginate

Figure 3A:
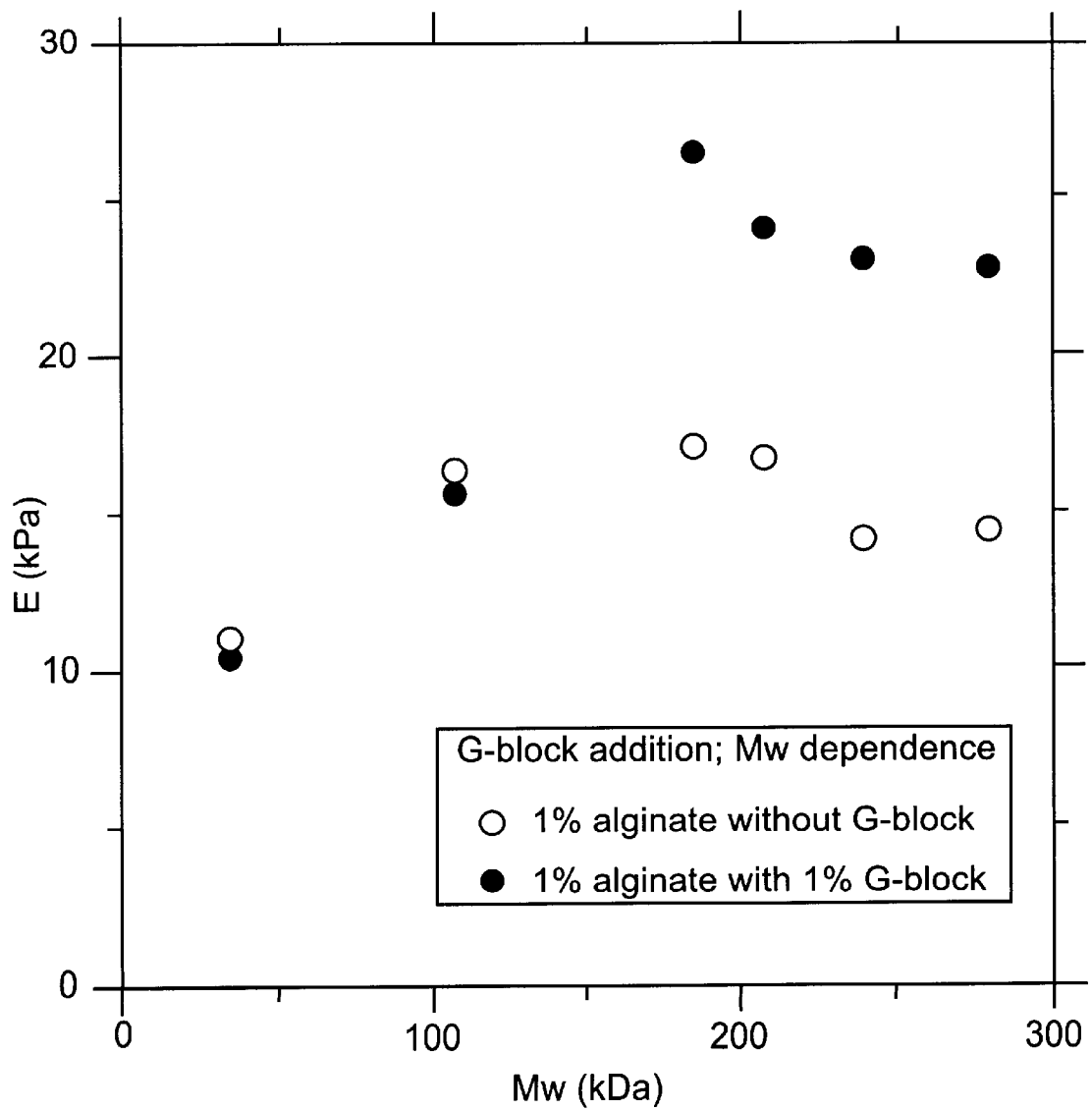
FIG. 3a shows variation of gel strength with molecular weight of the gelling alginate.

FIG. 3a shows how the gel strength varies with the molecular weight of the gelling alginate with 40 mM Ca both in pure alginate gels and in 1:1 alginate/G-block mixtures. The figure shows that medium to high molecular weight is recommended to achieve a high degree of synergy effect regarding gel strength.

Figure 3B:
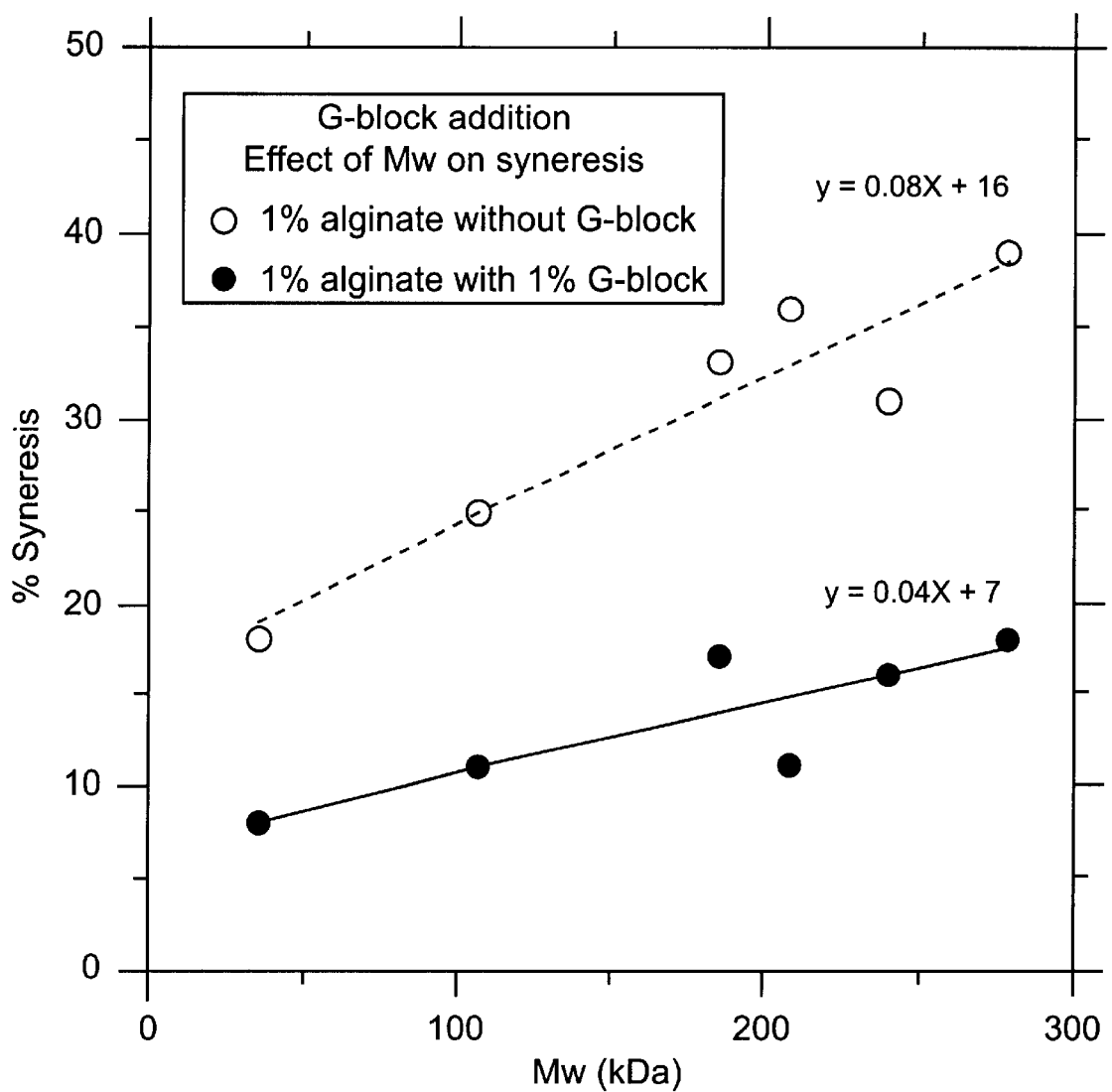
FIG. 3b shows change in the degree of syneresis.

FIG. 3b shows the change in the degree of syneresis in the same series of experiments. This shows that both the pure alginate gels and the mixtures produce increasing syneresis with increasing molecular weight, but that the degree of syneresis and the slope for molecular weight dependency are considerably reduced when G-block is added.

EXAMPLE 4

Kinetic Effects

Figure 4A:
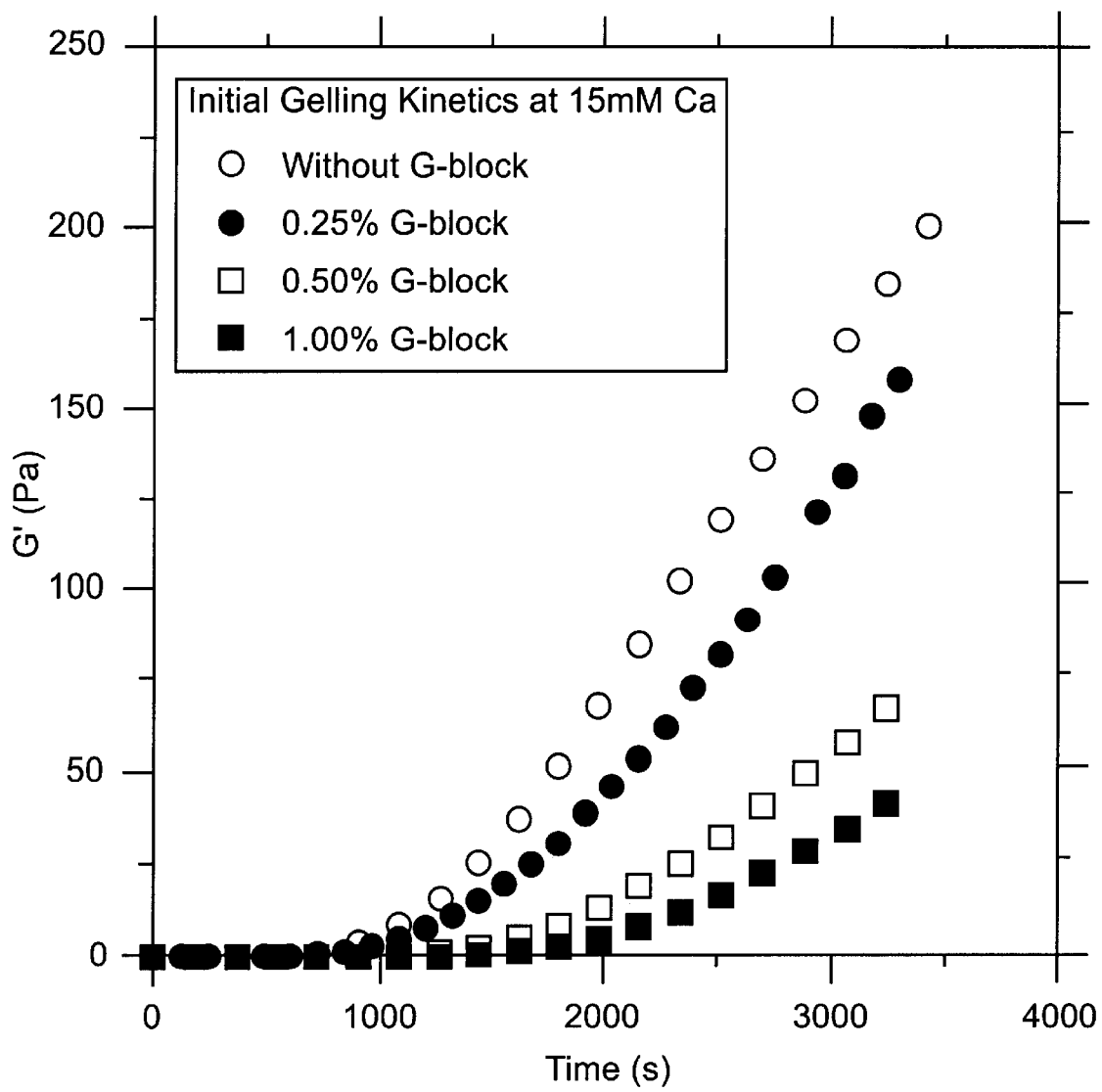
FIGS. 4a and 4b show the effect of the gel formation process on kinetics.
Figure 4B:
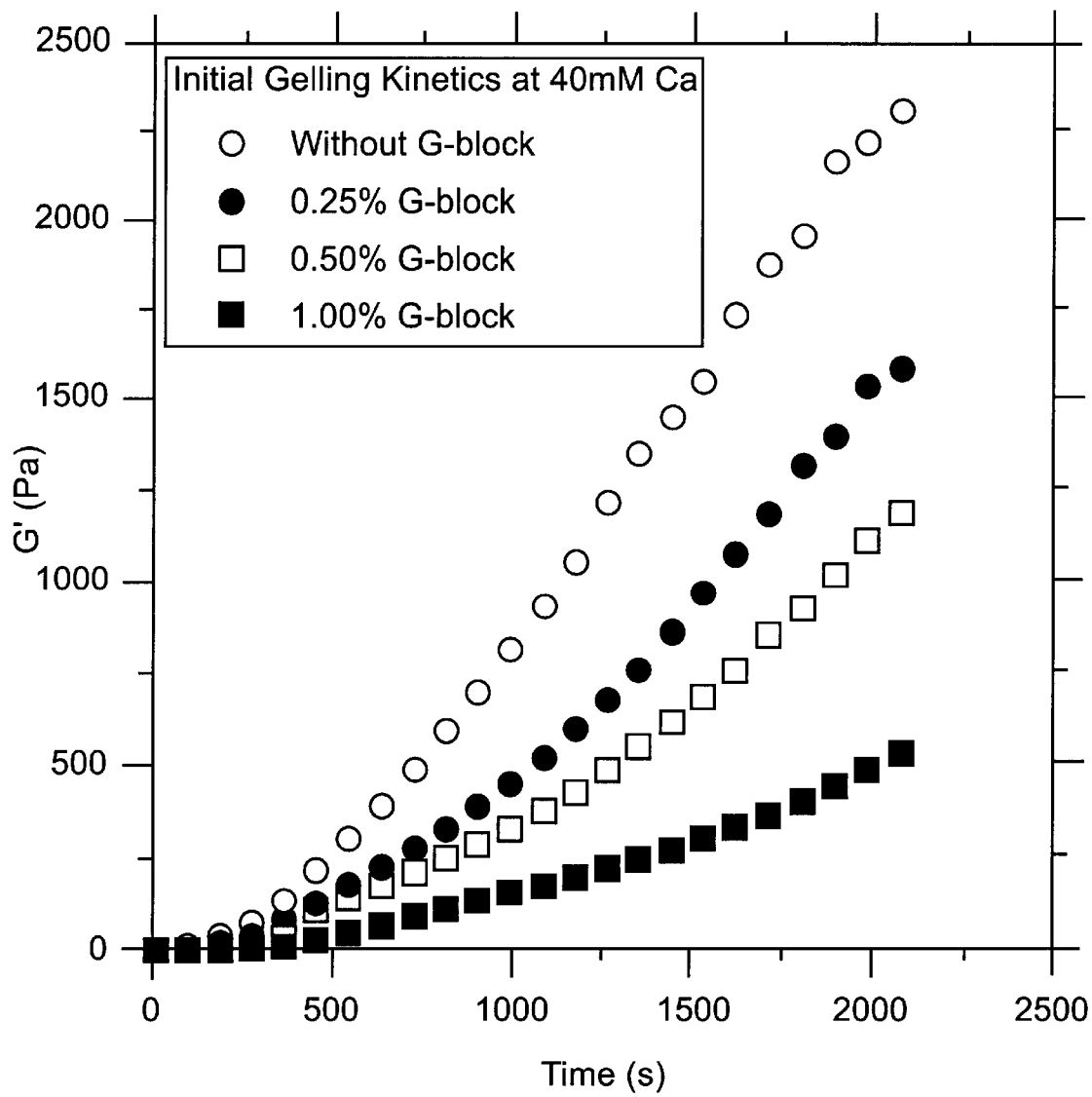

FIGS. 4a and 4b show the effect on the kinetics in the gel formation process, measured as the change in dynamic storage modulus (G') with the addition of different quantities of G-block with 15 and 40 mM Ca respectively. A reduction in gelling rate as a function of the quantity of G-block added is shown in both cases. This essential result, regarding the use of G-block instead of, for example, phosphates in kinetic control, can be attributed to the G-blocks' ability to bind Ca in the early phase of gel formation without entering into the network structures. This effect applies regardless of whether the equilibrium condition (the end properties) shows a lower gel strength when G-block is added (15 mM Ca) or an increased gel strength (40 mM).

EXAMPLE 5

Effect on Gel Strength and Syneresis with the Addition of Polygalacturonate

Figure 5A:
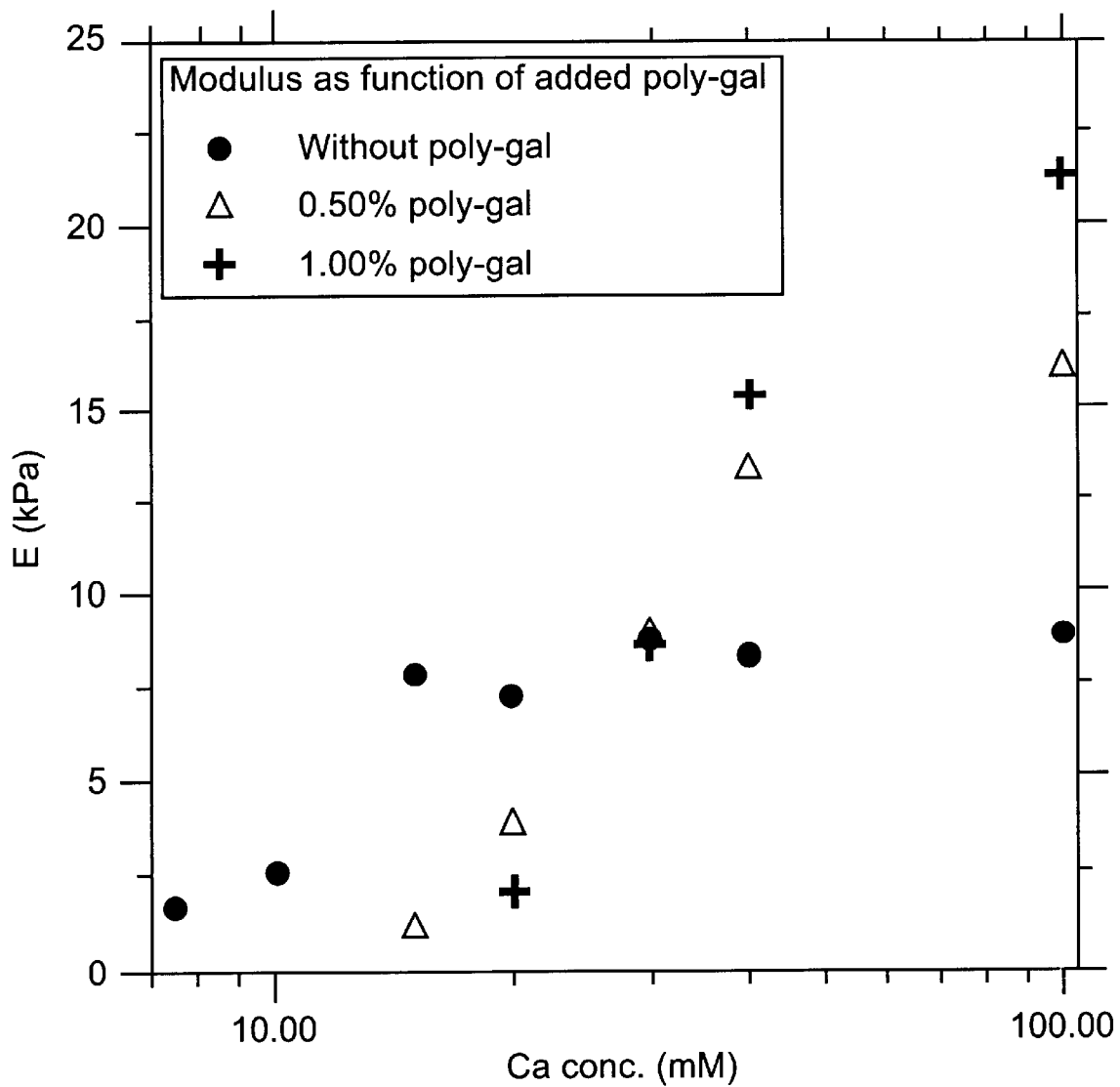
FIGS. 5a and 5b are similar to FIGS. 1a and 1b.
Figure 5B:
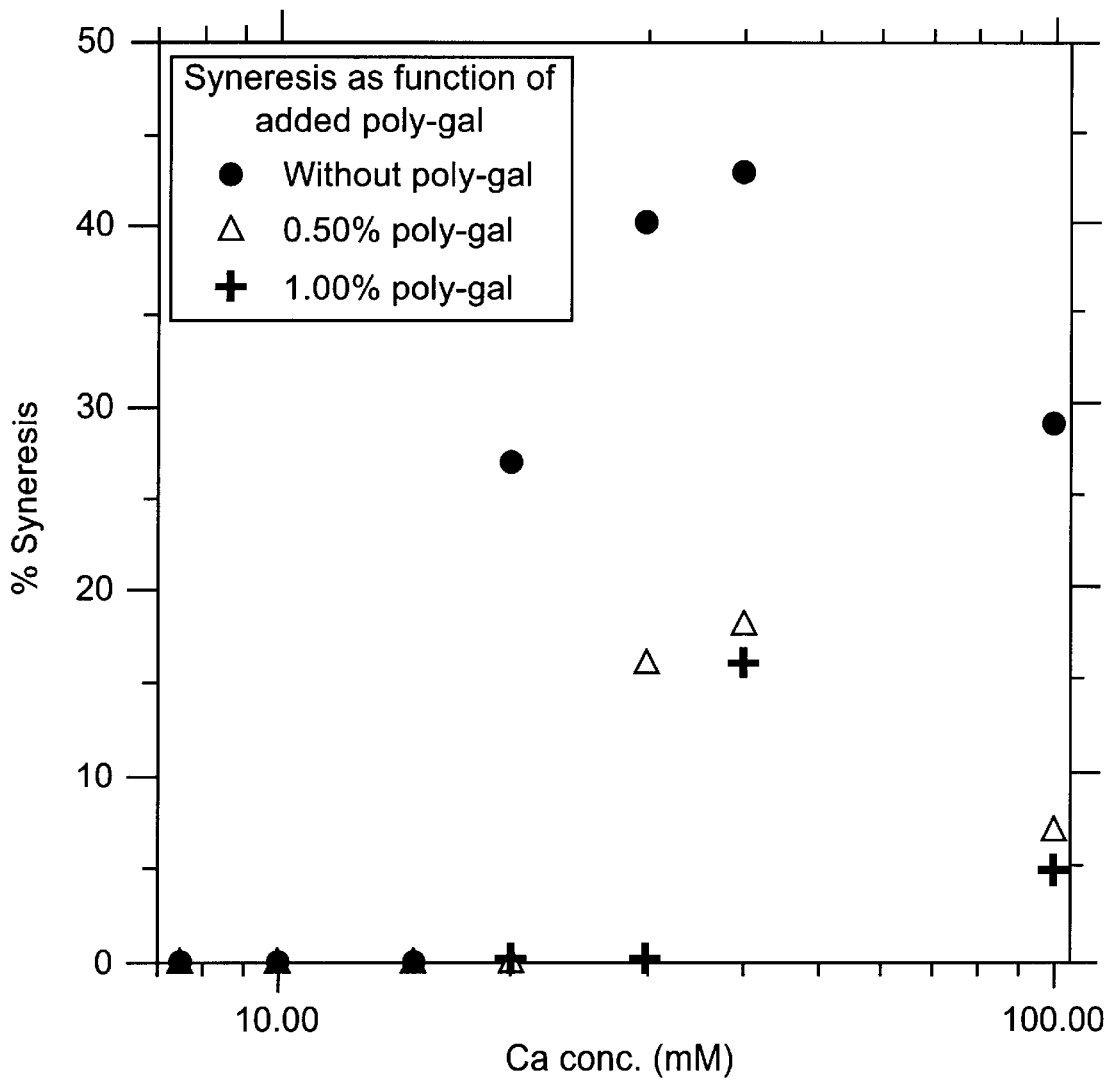

FIGS. 5a and 5b are the same as FIGS. 1a and 1b apart from the fact that polyguluronate has been replaced with polygalacturonate. The essential aspect of this example is that the effects of the two G-blocks are comparable. When both types of G-block polysaccharide are added, a reduction in gel strength is observed with a low to medium content of Ca and an increase is observed with a high content of Ca. The effect on syneresis is also the same for the two G-blocks; a reduction is observed as the quantity of G-block added increases. This example shows that low-methoxylated polygalacturonate has a similarly modulating effect mechanism as polyguluronate in this type of mixed gels by means of a similar binding of $Ca^{2+}$ ions.

EXAMPLE 6

Effect of the Addition of Ca G-block

Figure 6A:
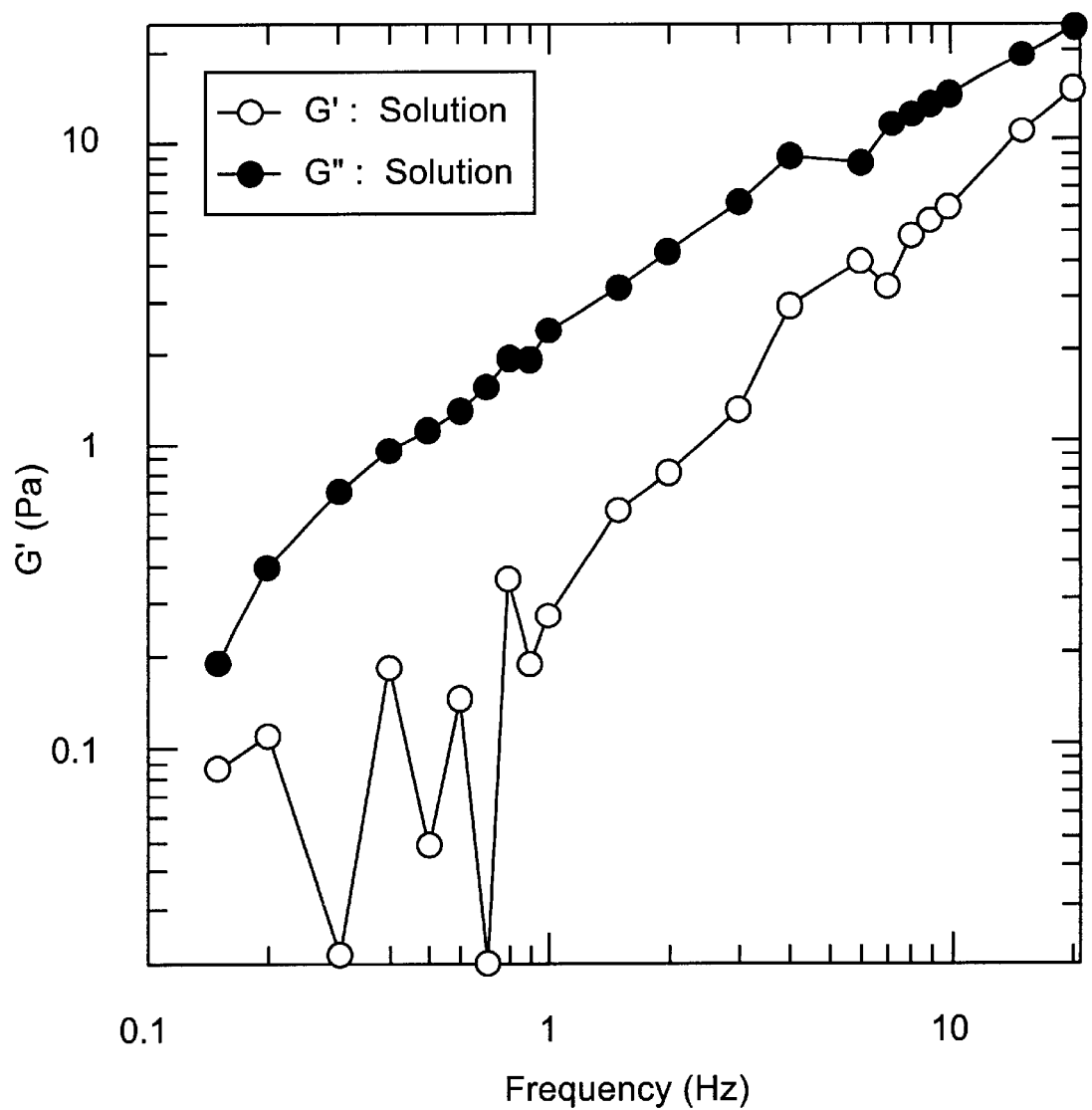
FIGS. 6a and 6b show elastic modulus and viscous modulus as a function of an alginate solution.
Figure 6B:
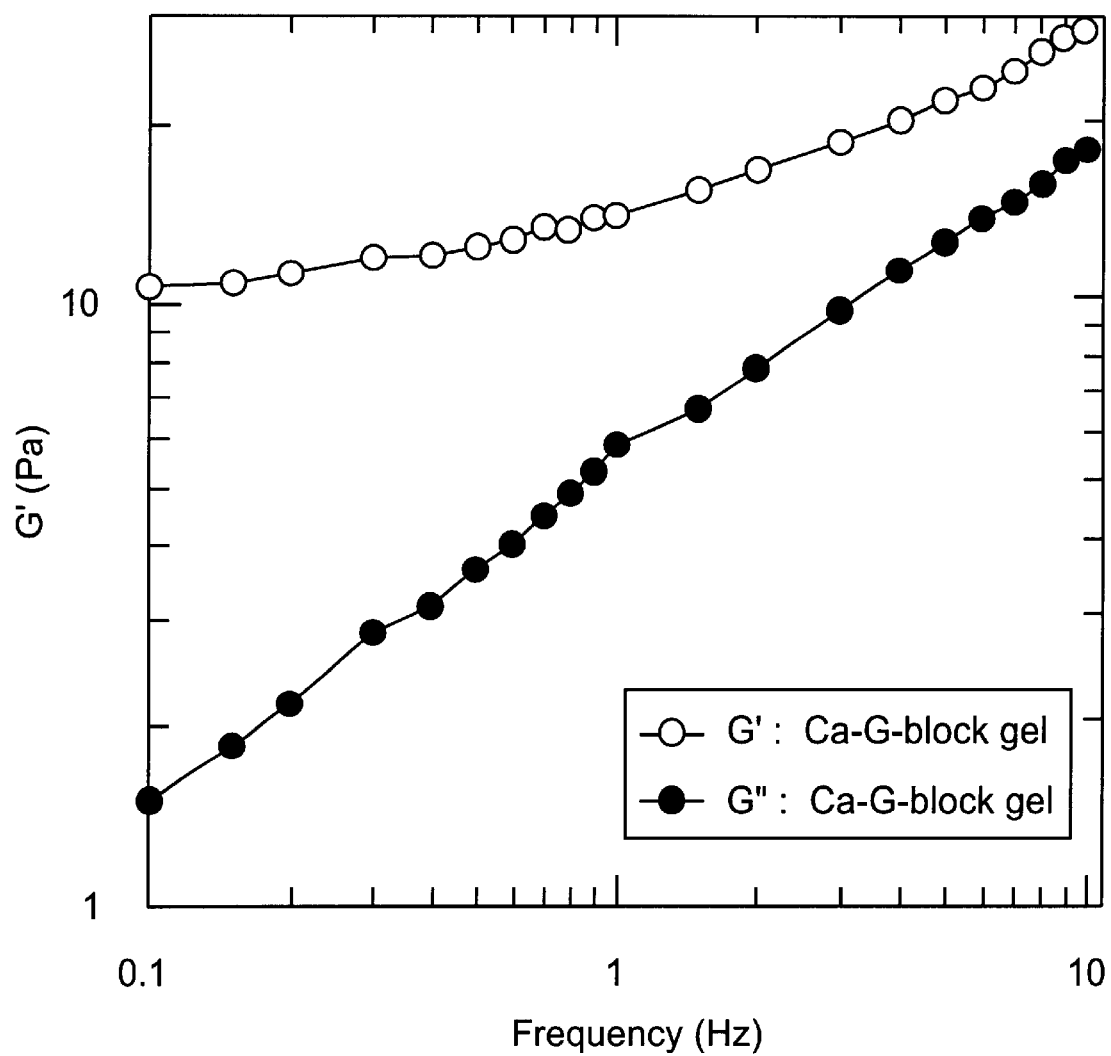

The dynamic measurements in FIGS. 6a and 6b show the elastic modulus (G') and viscous modulus (G") as a function of frequency for an alginate solution without added Ca G-block (a) and for an alginate/Ca G-block mixture (b). In FIG. 6a it can be seen that G'<G" for the full frequency range. This means that this is a viscoelastic solution. In FIG. 6b, the frequency sweep is done on a hardened gel. G'>G" here, which means that the addition of Ca G-block results in a viscoelastic gel via a sol/gel transition.

EXAMPLE 7

Kinetic Effects and Reversibility

The dynamic measurements in FIG. 7a show the gelling process and the reconstruction of the gel structure after each of the decompositions in which Ca G-block is the Ca source. FIG. 7b shows the same for a gel in which the Ca source is CaCO$_3$. In the construction, equilibrium is reached more rapidly with Ca G-block as the Ca source and there is a better structure after decomposition.

EXAMPLE 8

Effect on Strength and Syneresis with a Fixed Alginate Concentration in Milk Systems FIG. 8a shows how the gel strength changes as a function of added G-block and (added) calcium with a fixed (10 mg/ml) concentration of alginate. The same effects are achieved as in the pure water system, example 1. With a low to medium content of Ca, the addition of G-block makes a negative contribution to the gel strength. With a medium to high Ca content, on the other hand, the gel strength increases as the content of G-block increases.

Figure 8B:
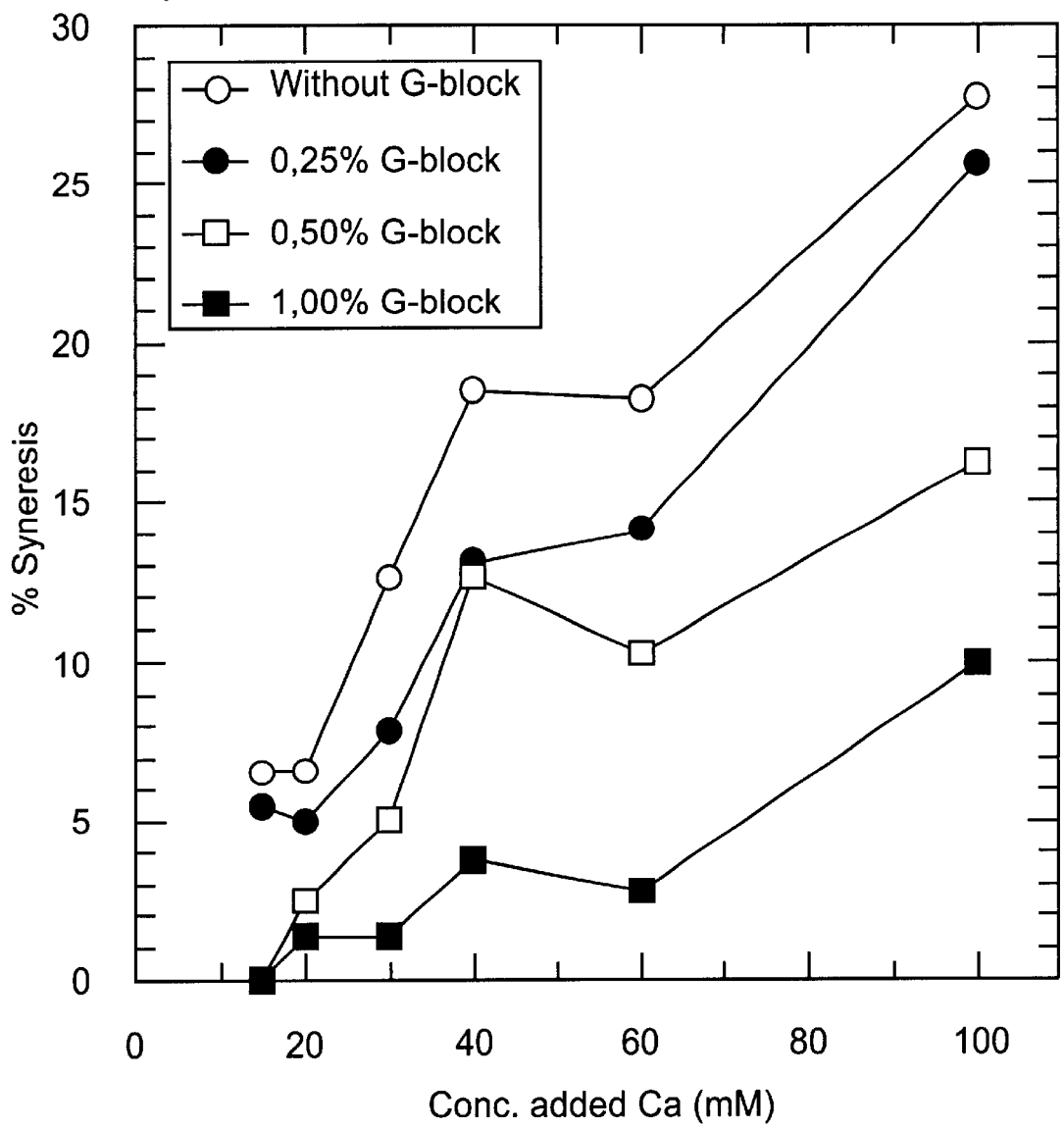
FIG. 8b shows the degree of syneresis as a function of added G-block.

FIG. 8b shows that in milk systems too the degree of syneresis decreases with a high content of Ca as the content of G-block increases.

EXAMPLE 9

Figure 9B:
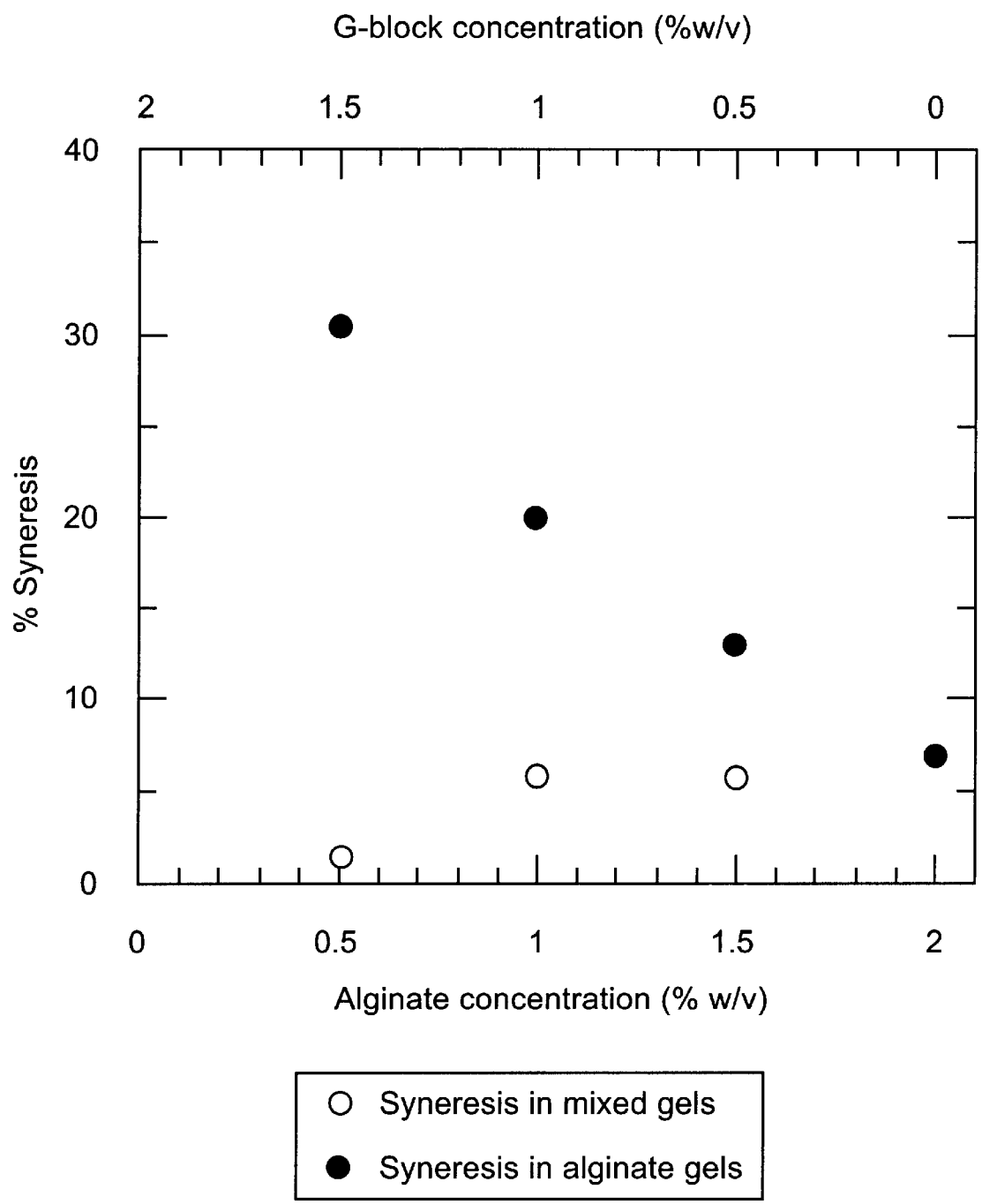

Effect of Varying Quantity of Alginate and G-block with a Fixed Quantity of Ca in Milk Systems FIGS. 9a and 9b are the same as FIGS. 2a and 2b, but in a milk system. FIG. 9a shows how the relative differences in gel strength between pure alginate gels and alginate/G-block mixtures vary with a fixed concentration (40 mM) of Ca. The same gelling alginate was used here as in example 2 (i.e. average molecular weight of 200 kDa). In this system too, the greatest gain in the form of gel strength is achieved with equivalent quantities of alginate and G-block. Other curves may be possible with other Ca concentrations.

FIG. 9b shows how the syneresis varies in the same experiment. The same effects are seen in milk systems as in the water system (example 2) even though the degree of syneresis is less in the milk system. In alginate/G-block mixtures, the syneresis is virtually constant and varies around 5%. In pure alginate systems, the syneresis increases greatly as the alginate concentration decreases.

EXAMPLE 10

Kinetic Effects in Milk Systems

Figure 10:
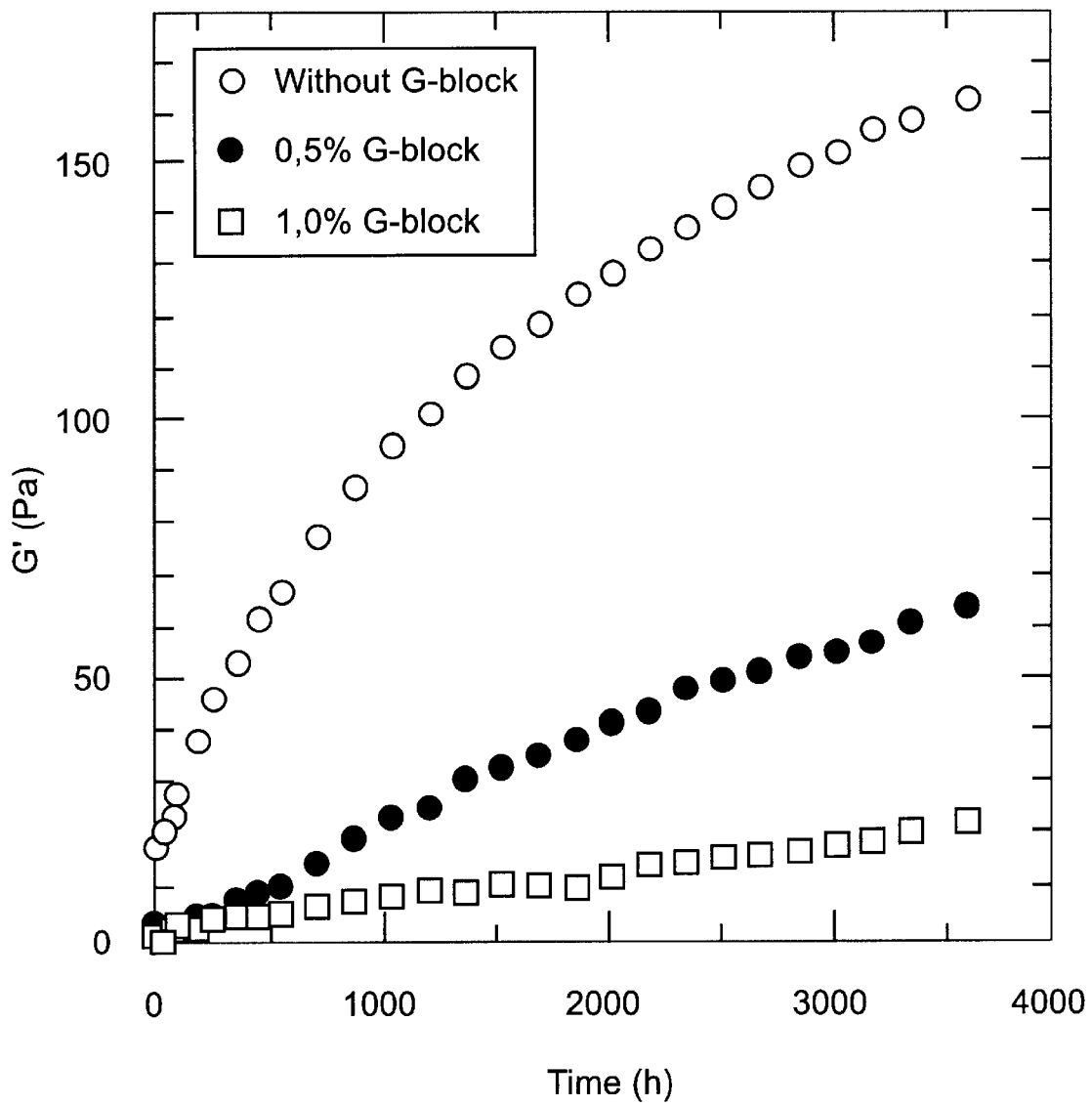
FIG. 10 shows how the gelling process effects kinetics.

FIG. 10 shows the effect on the kinetics in the gelling process, measured as the change in dynamic storage modulus (G') with the addition of different quantities of G-block to a milk system with only the Ca which occurs naturally in milk present. The same effects are seen in the milk system as in the water system, a reduction in gelling rate as the quantity of G-block added increases.

EXAMPLE 11

Production of Polyguluronate

Conversion to alginic acid:
10 g alginate of *Laminaria hyperborea* was dissolved in 1000 ml 0.3 M HCl and shaken for 24 hours.
Decomposition:
The solution was decanted and the insoluble fraction was added to 500 ml 0.3 M HCl and placed in a water bath for 5 hours at 100 C. After cooling, the undissolved fraction was filtered and washed with ion-free water. The undissolved fraction was dissolved by means of neutralisation and freeze-dried.

Cleaning:
The freeze-dried alginate was dissolved in ion-free water to form a 1% solution (w/v) and added to 0.1 M NaCl. The alginate solution was precipitated with 0.05 M HCl to pH 2.85.
Isolation:
The solution was centrifuged (5000 RPM for 15 minutes). The precipitate was washed twice in pH-adjusted, ion-free water (pH 2.85) and centrifuged between each wash in order thus to be suspended and dissolved by neutralisation. The G-block polysaccharide was freeze-dried.

EXAMPLE 12

Conversion of CaCO$_3$ to Free Ca$^{2+}$ by means of Alginic Acid G-block

Figure 11:
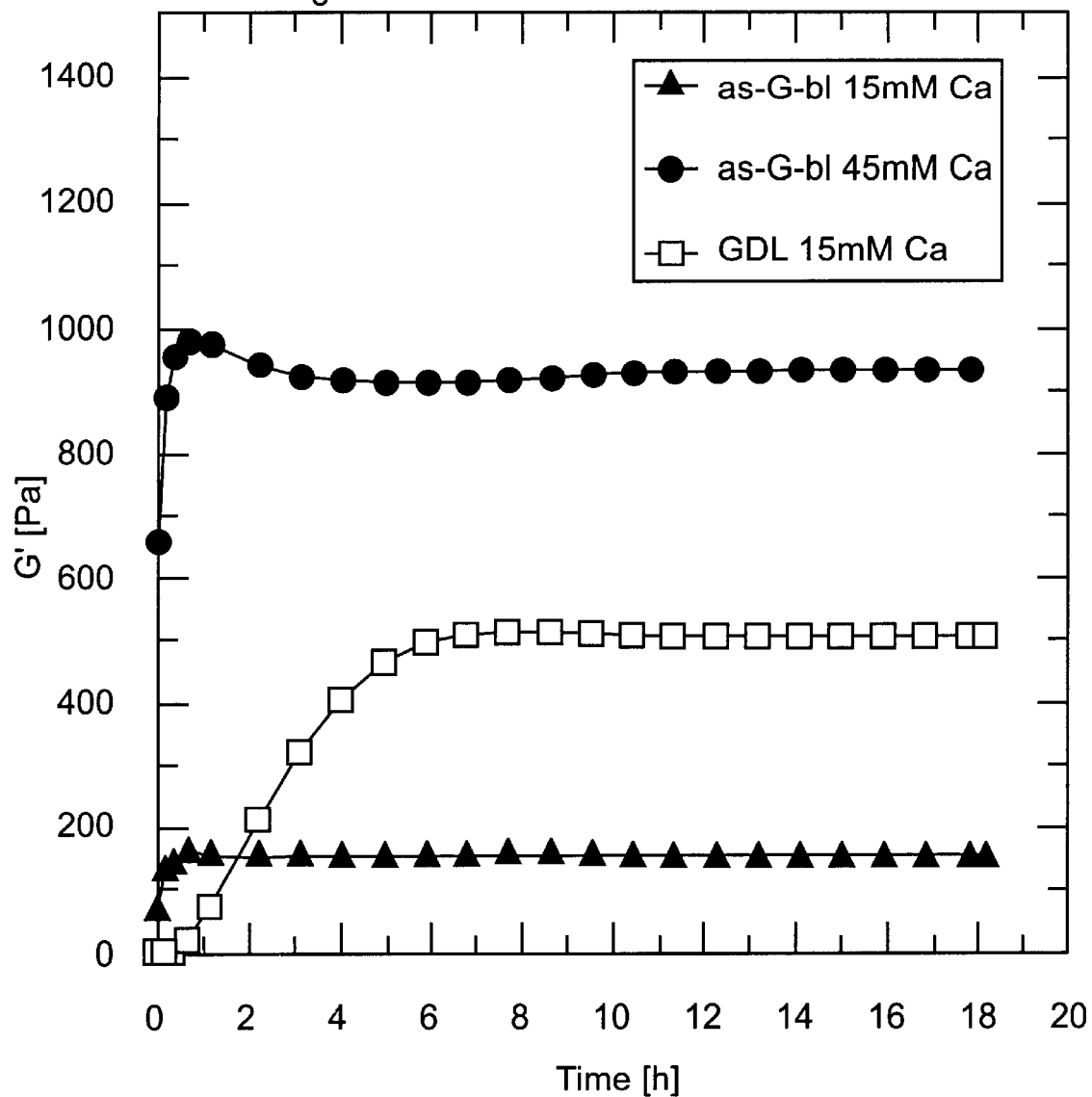
FIG. 11 shows an internal gelling system in which alginic acid G-block replaces the function of D-glucono-δ-lactone.

FIG. 11 shows a system in which alginic acid G-block replaces the function of D-glucono-δ-lactone in the internal gelling system described under materials and methods. CaCO$_3$ with low solubility and alginic acid G-block are added to an alginate solution. The alginic acid G-block converts the CaCO$_3$ to free Ca$^{2+}$ so that a gel network is formed.

In the figure, the alginic acid G-block system with two Ca levels is compared with the CaCO$_3$ and D-glucono-δ-lactone system. As for the Na G-block system, lower Ca levels produce a reduced gel strength while high Ca levels produce an increase. The initial gelling rate increases if D-glucono-δ-lactone is replaced with alginic acid G-block and the equilibrium level is reached more rapidly.

What is claimed is:

1. A method for controlling the rheology of a mixture containing at least one gelling, water-soluble first polysaccharide selected from the group consisting of alginate and pectin to give a final product of changed rheology, said method comprising:
   adding to the mixture a second polysaccharide consisting essentially of a G-block polysaccharide in an amount effective to change the rheology of the mixture, said second polysaccharide being added to the mixture either
   (a) as a water-soluble G-block polysaccharide in the presence of a source of a cross-linking ion or
   (b) as a G-block polysaccharide with a cross-linking ion or
   (c) as a substitute for another sequestering agent for a multivalent ion in the mixture, in which case a water-soluble G-block polysaccharide in the presence of a source of a cross-linking ion is used and,
   adding an aqueous solvent to the mixture, to obtain a final product having a desired changed rheology, and wherein the final product is a food, food additive, pharmaceutical, dental, cosmetic, biotechnological, medical or paint product.

2. A method in accordance with claim 1, wherein the G-block polysaccharide is selected from the group consisting of guluronic acid-rich alginate, G-block alginate, G-block pectin and galacturonic acid-rich pectin.

3. A method in accordance with claim 1, wherein the G-block polysaccharide is a water-soluble G-block polysaccharide selected from the group consisting of G-block polysaccharide with sodium, potassium, magnesium or ammonium as a gegenion.

4. A method in accordance with claim 1, wherein the gelling, water-soluble polysaccharide is selected from the group consisting of alginate and pectin with sodium, potassium, magnesium or ammonium as a gegenion.

5. A method in accordance with claim 1, wherein the G-block polysaccharide is a G-block polysaccharide with a cross-linking ion selected from the group consisting of G-block polysaccharide with multivalent calcium, strontium, barium, iron or aluminum as a gegenion.

6. A method in accordance with claim 1, wherein the source of cross linking ion is a calcium source selected from the group consisting of milk-based products, proteins, bone meal and silage.

7. A method in accordance with claim 6, wherein the calcium source is used in combination with a proton source.

8. A method in accordance with claim 1, wherein the calcium source is selected form the group consisting of $CaSO_4$, $CaCO_3$, and chelate-linked calcium.

9. A method in accordance with claim 8, wherein the chelate-linked calcium is CaEDTA.

10. A method in accordance with claim 1, wherein the aqueous solvent is water, an aqueous solution, or aqueous solution in a mixture with a non-aqueous component.

11. The method of claim 1, wherein said second polysaccharide is synthesized by conversion of M units to G units using an enzyme of the type mannuronan-C-5-epimerase.

12. A mixture comprising at least one gelling, water-soluble first polysaccharide selected from the group consisting of alginate and pectin, and a second polysaccharide consisting essentially of a G-block polysaccharide which is present in an amount effective to control the rheology of the mixture, together with a cross-linking ion, wherein the mixture is a food, food additive, pharmaceutical, dental, cosmetic, biotechnological, medical or paint product.

13. A mixture in accordance with claim 12, wherein the G-block polysaccharide is selected from the group consisting of guluronic acid-rich alginate, G-block alginate, G-block pectin and galacturonic acid-rich pectin.

14. A mixture in accordance with claim 12, wherein the G-block polysaccharide is a water-soluble G-block polysaccharide selected from the group consisting of G-block polysaccharide with sodium, potassium, magnesium or ammonium as a gegenion.

15. A mixture in accordance with claim 14, wherein the gelling, water-soluble polysaccharide is selected from the group consisting of alginate and pectin with sodium, potassium, magnesium or ammonium as a gegenion.

16. A mixture in accordance with claim 12, wherein the G-block polysaccharide is a G-block polysaccharide with a cross-linking ion selected from the group consisting of G-block polysaccharide with multivalent calcium, strontium, barium, iron or aluminum as a gegenion.

17. A mixture in accordance with claim 12, wherein the source of cross linking ion is a calcium source selected from the group consisting of milk-based products, proteins, bone meal and silage.

18. A mixture in accordance with claim 17, wherein the calcium source is used in combination with a proton source.

19. A mixture in accordance with claim 12, wherein the calcium source is selected from the group consisting of $CaSO_4$, $CaCO_3$, and chelate-linked calcium.

20. A mixture in accordance with claim 19, wherein the chelate-linked calcium is CaEDTA.

21. A mixture in accordance with claim 12, further comprising an aqueous solvent which is water, an aqueous solution, or aqueous solution in a mixture with a non-aqueous component.

22. The method of claim 12, wherein said second polysaccharide is synthesized by conversion of M units to G units using an enzyme of the type mannuronan-C-5-epimerase.

23. A method for controlling the rheology of a mixture containing at least one gelling, water-soluble first polysaccharide selected from the group consisting of alginate and pectin to give a final product of changed rheology, said method comprising:

adding to the mixture a second polysaccharide consisting essentially of a G-block polysaccharide in an amount effective to change the rheology of the mixture, said second polysaccharide being added to the mixture either
(a) as a water-soluble G-block polysaccharide in the presence of a source of a cross-linking ion or
(b) as a G-block polysaccharide with a cross-linking ion or
(c) as a substitute for another sequestering agent for a multivalent ion in the mixture, in which case a water-soluble G-block polysaccharide in the presence of a source of a cross-linking ion is used; and, adding an aqueous solvent to the mixture to obtain a final product having a desired changed rheology, said first polysaccharide and said second polysaccharide in a ratio of from about 100:1 to about 1:100.

24. The method of claim 23, wherein said first polysaccharide and said second polysaccharide are in a ratio of from about 10:1 to about 1:10.

25. The method of claim 23, wherein said first polysaccharide and said second polysaccharide are in a ratio of from about 4:1 to about 1:4.

26. The method of claim 23, wherein said first polysaccharide and said second polysaccharide are in a ratio of about 1:1.

27. A method in accordance with claim 23, wherein the G-block polysaccharide is selected from the group consisting of guluronic acid-rich alginate, G-block alginate, G-block pectin and galacturonic acid-rich pectin.

28. A method in accordance with claim 23, wherein the G-block polysaccharide is a water-soluble G-block polysaccharide selected from the group consisting of G-block polysaccharide with sodium, potassium, magnesium or ammonium as a gegenion.

29. A method in accordance with claim 23, wherein the gelling, water-soluble polysaccharide is selected from the group consisting of alginate and pectin with sodium, potassium, magnesium or ammonium as a gegenion.

30. A method in accordance with claim 23, wherein the G-block polysaccharide is a G-block polysaccharide with a cross-linking ion selected from the group consisting of G-block polysaccharide with multivalent calcium, strontium, barium, iron or aluminum as a gegenion.

31. A method in accordance with claim 23, wherein the source of cross linking ion is a calcium source selected from the group consisting of milk-based products, proteins, bone meal and silage.

32. A method in accordance with claim 32, wherein the cross-linking ion is selected from the group consisting of $CaSO_4$, $CaCO_3$, and chelate-linked calcium.

33. A method in accordance with claim 23, wherein the chelate-linked calcium is CaEDTA.

34. A method in accordance with claim 23, wherein the cross-linking ion is from a calcium source and is used in combination with a proton source.

35. A method in accordance with claim 23, wherein the aqueous solvent is water, an aqueous solution, or aqueous solution in a mixture with a non-aqueous component.

36. The method of claim 23, wherein said second polysaccharide is synthesized by conversion of M units to G units using an enzyme of the type mannuronan-C-5-epimerase.

37. A mixture comprising:
at least one gelling, water-soluble first polysaccharide selected from the group consisting of alginate and pectin; and a second polysaccharide consisting essentially of a G-block polysaccharide which is present in an amount effective to control the rheology of the mixture, together with a cross-linking ion, said first polysaccharide and said second polysaccharide in a ratio of from about 100:1 to about 1:100.

38. The mixture of claim 37, wherein said first polysaccharide and said second polysaccharide are in a ratio of from about 10:1 to about 1:10.

39. The mixture of claim 37, wherein said first polysaccharide and said second polysaccharide are in a ratio of from about 4:1 to about 1:4.

40. The mixture of claim 37, wherein said first polysaccharide and said second polysaccharide are in a ratio of about 1:1.

41. A mixture in accordance with claim 37, wherein the G-block polysaccharide is selected from the group consisting of guluronic acid-rich alginate, G-block alginate, G-block pectin and galacturonic acid-rich pectin.

42. The mixture of claim 41, wherein said second polysaccharide is synthesized by conversion of M units to G units using an enzyme of the type mannuronan-C-5-epimerase.

43. A mixture in accordance with claim 37, wherein the G-block polysaccharide is a water-soluble G-block polysaccharide selected from the group consisting of G-block polysaccharide with sodium, potassium, magnesium or ammonium as a gegenion.

44. A mixture in accordance with claim 43, wherein the gelling, water-soluble polysaccharide is selected from the group consisting of alginate and pectin with sodium, potassium, magnesium or ammonium as a gegenion.

45. A mixture in accordance with claim 37, wherein the G-block polysaccharide is a G-block polysaccharide with a cross-linking ion selected from the group consisting of G-block polysaccharide with multivalent calcium, strontium, barium, iron or aluminum as a gegenion.

46. A mixture in accordance with claim 37, wherein the cross-linking ion is from a calcium source selected from the group consisting of milk-based products, proteins, bone meal and silage.

47. A mixture in accordance with claim 37, wherein the cross-linking ion is selected from the group consisting of $CaSO_4$, $CaCO_3$, and chelate-linked calcium.

48. A mixture in accordance with claim 47, wherein the chelate-linked calcium is CaEDTA.

49. A mixture in accordance with claim 37, wherein the cross linking ion is from a calcium source and is used in combination with a proton source.

50. A mixture in accordance with claim 37, further comprising an aqueous solvent which is water, an aqueous solution, or aqueous solution in a mixture with a non-aqueous component.

* * * * *